US00RE50383E

(19) United States
(12) Reissued Patent
Tsukagoshi

(10) Patent Number: US RE50,383 E
(45) Date of Reissued Patent: Apr. 15, 2025

(54) TRANSMISSION DEVICE, TRANSMISSION METHOD, RECEPTION DEVICE, AND RECEPTION METHOD

(71) Applicant: SONY GROUP CORPORATION, Tokyo (JP)

(72) Inventor: Ikuo Tsukagoshi, Tokyo (JP)

(73) Assignee: SONY GROUP CORPORATION, Tokyo (JP)

(21) Appl. No.: 18/091,142

(22) Filed: Dec. 29, 2022

Related U.S. Patent Documents

Reissue of:
(64) Patent No.: 10,878,828
Issued: Dec. 29, 2020
Appl. No.: 15/506,298
PCT Filed: Sep. 7, 2015
PCT No.: PCT/JP2015/075318
§ 371 (c)(1),
(2) Date: Feb. 24, 2017
PCT Pub. No.: WO2016/039287
PCT Pub. Date: Mar. 17, 2016

(30) Foreign Application Priority Data

Sep. 12, 2014 (JP) ..... 2014-187085

(51) Int. Cl.
*G10L 19/018* (2013.01)
*G10L 19/008* (2013.01)
(Continued)

(52) U.S. Cl.
CPC ..... *G10L 19/018* (2013.01); *G10L 19/008* (2013.01); *G10L 19/167* (2013.01);
(Continued)

(58) Field of Classification Search
CPC ..... H04S 5/02; H04N 21/8456; H04N 21/64322; H04N 21/23439; H04N 21/435;
(Continued)

(56) References Cited

U.S. PATENT DOCUMENTS 8,482,614 B2 * 7/2013 Dean ..... H04N 21/84 348/460
9,026,450 B2 * 5/2015 Dressler ..... H04S 3/02 704/500
(Continued)

FOREIGN PATENT DOCUMENTS

CN 101056245 A 10/2007
CN 101310461 A 11/2008
(Continued)

OTHER PUBLICATIONS

Extended European Search Report issued Feb. 6, 2018 in Patent Application No. 15839650.7.
(Continued)

*Primary Examiner* — Ovidio Escalante
(74) *Attorney, Agent, or Firm* — Oblon, McClelland, Maier & Neustadt, L.L.P.

(57) ABSTRACT

The present technology reduces a process load in a reception side when a plurality of types of audi data is transmitted. A metafile having meta information used to acquire, in a reception device, a predetermined number of audio streams including a plurality of groups of encoded data is transmitted. To the metafile, attribute information indicating each attribute of the encoded data of the plurality of groups is inserted. For example, to the metafile, stream correspondence relation information indicating in which audio stream the encoded data of the plurality of groups is included respectively is further inserted.

24 Claims, 20 Drawing Sheets

(51) Int. Cl.

| | |
|---|---|
| ***G10L 19/16*** | (2013.01) |
| ***G10L 19/24*** | (2013.01) |
| ***H04N 21/2343*** | (2011.01) |
| ***H04N 21/235*** | (2011.01) |
| ***H04N 21/435*** | (2011.01) |
| ***H04N 21/439*** | (2011.01) |
| ***H04N 21/6332*** | (2011.01) |
| ***H04N 21/643*** | (2011.01) |
| ***H04N 21/81*** | (2011.01) |
| ***H04N 21/845*** | (2011.01) |
| ***H04N 21/854*** | (2011.01) |
| ***H04S 5/02*** | (2006.01) |
| *H04N 21/233* | (2011.01) |

(52) U.S. Cl.
CPC ... *H04N 21/23439* (2013.01); *H04N 21/2353* (2013.01); *H04N 21/435* (2013.01); *H04N 21/439* (2013.01); *H04N 21/6332* (2013.01); *H04N 21/64322* (2013.01); *H04N 21/8106* (2013.01); *H04N 21/8456* (2013.01); *H04N 21/85406* (2013.01); *H04S 5/02* (2013.01); *G10L 19/24* (2013.01); *H04N 21/233* (2013.01); *H04N 21/4358* (2013.01)

(58) Field of Classification Search
CPC ..... H04N 21/85406; H04N 21/6332; H04N 21/439; H04N 21/2353; H04N 21/8106; H04N 21/4358; H04N 21/233; G10L 19/018; G10L 19/167; G10L 19/0008; G10L 19/24
See application file for complete search history.

(56) References Cited

U.S. PATENT DOCUMENTS

| | | | | |
|---|---|---|---|---|
| 9,319,014 | B2 * | 4/2016 | Oh | H03G 3/00 |
| 2009/0262957 | A1 * | 10/2009 | Oh | H04S 7/30 381/119 |
| 2009/0265023 | A1 * | 10/2009 | Oh | H04S 7/30 700/94 |
| 2010/0014692 | A1 * | 1/2010 | Schreiner | H04S 3/008 381/119 |
| 2010/0017002 | A1 * | 1/2010 | Oh | G10L 19/008 700/94 |
| 2010/0017003 | A1 * | 1/2010 | Oh | G10L 19/008 700/94 |
| 2010/0191354 | A1 | 7/2010 | Oh | |
| 2011/0040396 | A1 * | 2/2011 | Kraemer | G10L 19/167 700/94 |
| 2012/0232910 | A1 * | 9/2012 | Dressler | H04S 3/02 704/500 |
| 2013/0279879 | A1 | 10/2013 | Watanabe et al. | |
| 2014/0001337 | A1 | 1/2014 | Corwin | |
| 2014/0013375 | A1 | 1/2014 | Giladi | |
| 2014/0023197 | A1 * | 1/2014 | Xiang | H04S 1/007 381/17 |
| 2014/0105422 | A1 * | 4/2014 | Oh | G10L 19/008 381/119 |
| 2014/0119581 | A1 * | 5/2014 | Tsingos | H04S 5/00 381/300 |
| 2014/0135963 | A1 * | 5/2014 | Roeden | G10L 19/167 700/94 |
| 2014/0161285 | A1 * | 6/2014 | Oh | G10L 19/008 381/107 |
| 2015/0089533 | A1 | 3/2015 | Giladi et al. | |
| 2015/0223002 | A1 * | 8/2015 | Mehta | H04S 7/30 381/303 |
| 2015/0350804 | A1 * | 12/2015 | Crockett | H04S 7/30 381/307 |
| 2015/0381692 | A1 | 12/2015 | Giladi et al. | |
| 2017/0006274 | A1 | 1/2017 | Watanabe et al. | |
| 2017/0104803 | A1 | 4/2017 | Giladi et al. | |
| 2017/0263259 | A1 * | 9/2017 | Tsukagoshi | G10L 19/008 |

FOREIGN PATENT DOCUMENTS

| | | | |
|---|---|---|---|
| CN | 101399042 | A | 4/2009 |
| CN | 101536101 | A | 9/2009 |
| CN | 101675472 | A | 3/2010 |
| CN | 203415228 | U | 1/2014 |
| CN | 103620678 | A | 3/2014 |
| CN | 104025604 | A | 9/2014 |
| CN | 104041111 | A | 9/2014 |
| CN | 201580047469.3 | | 9/2015 |
| CN | 106663431 | A | 5/2017 |
| CN | 106663431 | B | 4/2021 |
| CN | 113077800 | A | 7/2021 |
| EP | 2 665 262 | A1 | 11/2013 |
| JP | 2008-172767 | A | 7/2008 |
| JP | 2009-278381 | A | 11/2009 |
| JP | 2012-033243 | A | 2/2012 |
| JP | 2014-520491 | A | 8/2014 |
| JP | 2016519788 | A | 7/2016 |
| JP | 2022021541 | | 2/2022 |
| KR | 20140017344 | A | 2/2014 |
| WO | WO-2007027056 | A1 | 3/2007 |
| WO | WO 2014/007083 | A1 | 1/2014 |
| WO | 2014/109321 | A1 | 7/2014 |

OTHER PUBLICATIONS

Notification of the First Office Action mailed Mar. 3, 2020 in corresponding Chinese Patent Application No. 2015800474693 (with English translation)(18 pages).
Office Action issued Oct. 8, 2019 in Japanese Patent Application No. 2016-54 7428.
Office Action dated Jan. 21, 2025, issued in counterpart JP Application No. 2023-094430, with English Translation, (6 pages).
"Information technology—Dynamic adaptive streaming over HTTP (DASH)—Part 1: Media presentation description and segment formats", ISO/IEC JTC 1/SC 29, ISO/IEC 23009-1:2012(E), ISO/IEC JTC 1/SC 29/WG 11, XP030018824, Jan. 2012, 133 pages.
"Information technology—High efficiency coding and media delivery in heterogeneous environments—Part 3: 3D audio", ISO/IEC JTC 1/SC 29 N, ISO/IEC CD 23008-3, ISO/IEC JTC 1/SC 29/WG 11, XP030021195, Apr. 2014, 337 pages.
Stephan Schreiner, et al., "On Multiple MPEG-H 3D Audio Streams", International Organisation for Standardisation Organisation Internationale De Normalisation, ISO/IEC JTC1/SC29/WG11, Coding of Moving Pictures and Audio, XP030062639, Jul. 2014, 6 pages.
European Office Communication dated Jun. 6, 2019 including European Search Report in European Patent Application No. 19156452.5.
Text of ISO/IEC 23008-3/CD, 3D audio, Coding of Moving Pictures and Audio, International Organisation for Standardisation, ISO/IEC JTC1/SC29/WG11 N14459, Apr. 2014, Valencia, Spain.
Stephan Schreiner et al., on multiple MPEG-H 3D Audio streams, Coding of Moving Pictures and Audio, International Organisation for Standardisation, ISO/IEC JTC1/SC29/WG11 MPEG2014/M34266, Jul. 2014, Sapporo, Japan.
Information technology—Dynamic adaptive streaming over HTTP (DASH)—Part 1: Media presentation description and segment formats, ISO/IEC 23009-1:2012(E), ISO/IEC JTC 1/SC 29/WG 11, Date: Jan. 5, 2012.

* cited by examiner

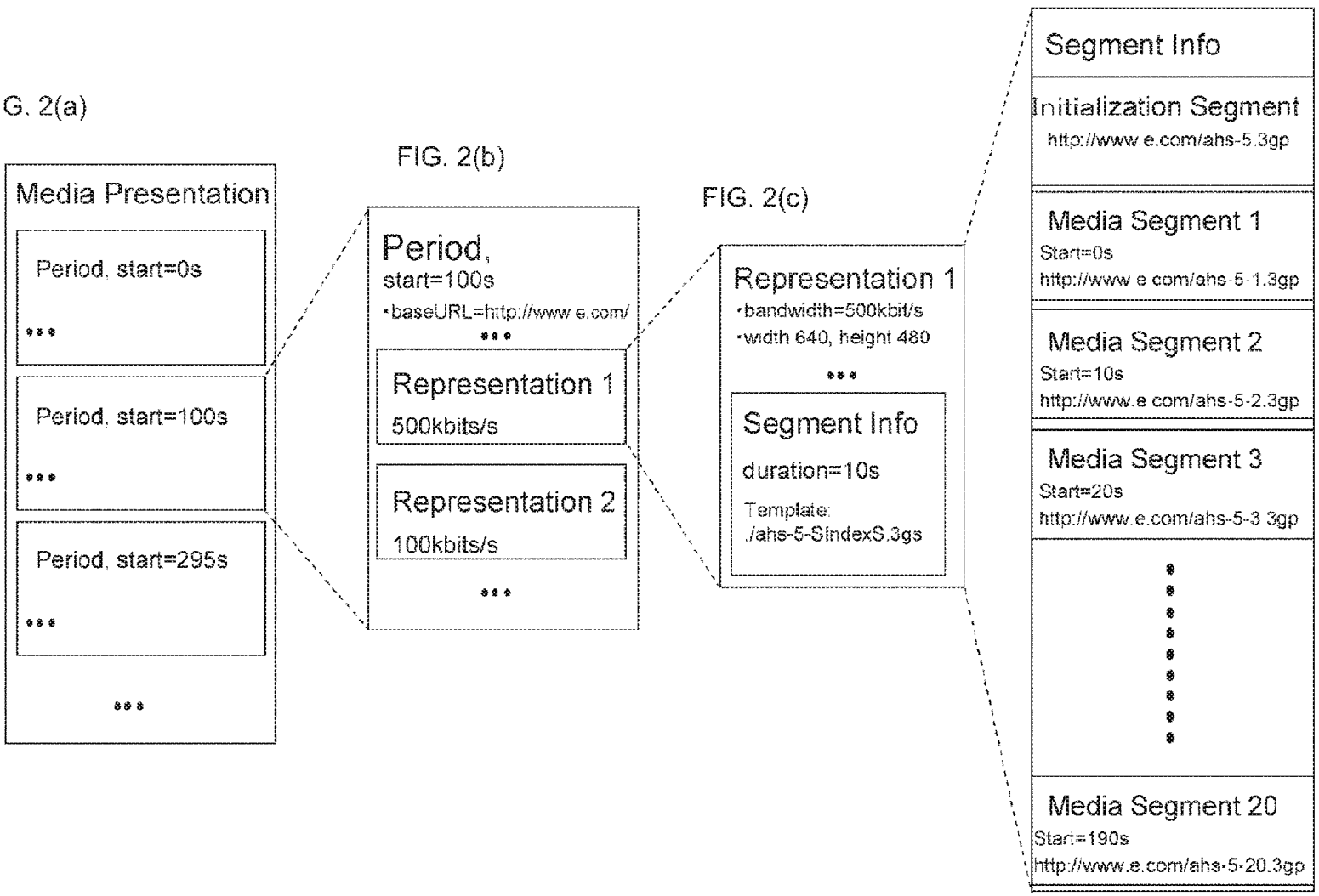
FIG. 2(a)
Media Presentation
Period, start=0s
...
Period, start=100s
...
Period, start=295s
...
...
FIG. 2(b)
Period,
start=100s
•baseURL=http://www.e.com/
...
Representation 1
500kbits/s
Representation 2
100kbits/s
...
FIG. 2(c)
Representation 1
•bandwidth=500kbit/s
•width 640, height 480
...
Segment Info
duration=10s
Template:
./ahs-5-SIndexS.3gs
FIG. 2(d)
Segment Info
Initialization Segment
http://www.e.com/ahs-5.3gp
Media Segment 1
Start=0s
http://www.e.com/ahs-5-1.3gp
Media Segment 2
Start=10s
http://www.e.com/ahs-5-2.3gp
Media Segment 3
Start=20s
http://www.e.com/ahs-5-3.3gp
Media Segment 20
Start=190s
http://www.e.com/ahs-5-20.3gp

FIG. 8

| groupID | attribute | switchGroupID | presetGroupID [1] | [2] | trackID |
|---|---|---|---|---|---|
| 1 | Channel data | 0 | 1 | 1 | 1 |
| 2 | Object sound | 0 | 2 | 2 | 2 |
| 3 | Object language1 | 1 | 3 | | 3 |
| 4 | Object language2 | 1 | | 4 | 4 |

FIG. 10

| groupID | attribute | switchGroupID | presetGroupID [1] | presetGroupID [2] | trackID |
|---|---|---|---|---|---|
| 1 | Channel data | 0 | 1 | 1 | 1 |
| 2 | Object sound | 0 | 2 | 2 | 1 |
| 3 | Object language1 | 1 | 3 | | 2 |
| 4 | Object language2 | 1 | | 4 | 2 |

FIG. 11

```
<MPD>
  <Period>
        <AdaptationSet mimeType="audio/mp4" group="1">
              <SupplementaryDescriptor schemeIdUri="urn:brdcst:codecType" value="mpegh"/>
              <SupplementaryDescriptor schemeIdUri="urn:brdcst:3dAudio:groupId" value="group1"/>
              <SupplementaryDescriptor schemeIdUri="urn:brdcst:3dAudio:attribute" value="channeldata"/>
              <SupplementaryDescriptor schemeIdUri="urn:brdcst:3dAudio:switchGroupId" value="0"/>
              <SupplementaryDescriptor schemeIdUri="urn:brdcst:3dAudio:presetGroupId" value="preset1"/>
              <SupplementaryDescriptor schemeIdUri="urn:brdcst:3dAudio:presetGroupId" value="preset2"/>
              <Representation id="1" bandwidth="128000">
                    <baseURL>audio/jp1/128.mp4</BaseURL>
                    <SupplementaryDescriptor schemeIdUri="urn:brdcst:3dAudio:levelId" value="level1"/>
              </Representation>
        </AdaptationSet>
        <AdaptationSet mimeType="audio/mp4" group="2">
              <SupplementaryDescriptor schemeIdUri="urn:brdcst:codecType" value="mpegh"/>
              <SupplementaryDescriptor schemeIdUri="urn:brdcst:3dAudio:groupId" value="group2"/>
              <SupplementaryDescriptor schemeIdUri="urn:brdcst:3dAudio:attribute" value="objectSound"/>
              <SupplementaryDescriptor schemeIdUri="urn:brdcst:3dAudio:switchGroupId" value="0"/>
              <SupplementaryDescriptor schemeIdUri="urn:brdcst:3dAudio:presetGroupId" value="preset1"/>
              <SupplementaryDescriptor schemeIdUri="urn:brdcst:3dAudio:presetGroupId" value="preset2"/>
              <Representation id="2" bandwidth="128000">
                    <baseURL>audio/jp2/128.mp4</BaseURL>
                    <SupplementaryDescriptor schemeIdUri="urn:brdcst:3dAudio:levelId" value="level2"/>
              </Representation>
        </AdaptationSet>
        <AdaptationSet mimeType="audio/mp4" group="3">
              <SupplementaryDescriptor schemeIdUri="urn:brdcst:codecType" value="mpegh"/>
              <SupplementaryDescriptor schemeIdUri="urn:brdcst:3dAudio:groupId" value="group3"/>
              <SupplementaryDescriptor schemeIdUri="urn:brdcst:3dAudio:attribute" value="objectLang1"/>
              <SupplementaryDescriptor schemeIdUri="urn:brdcst:3dAudio:switchGroupId" value="1"/>
              <SupplementaryDescriptor schemeIdUri="urn:brdcst:3dAudio:presetGroupId" value="preset1"/>
              <Representation id="3" bandwidth="128000">
                    <baseURL>audio/jp3/128.mp4</BaseURL>
                    <SupplementaryDescriptor schemeIdUri="urn:brdcst:3dAudio:levelId" value="level3"/>
              </Representation>
        </AdaptationSet>
        <AdaptationSet mimeType="audio/mp4" group="4">
              <SupplementaryDescriptor schemeIdUri="urn:brdcst:codecType" value="mpegh"/>
              <SupplementaryDescriptor schemeIdUri="urn:brdcst:3dAudio:groupId" value="group4"/>
              <SupplementaryDescriptor schemeIdUri="urn:brdcst:3dAudio:attribute" value="objectLang2"/>
              <SupplementaryDescriptor schemeIdUri="urn:brdcst:3dAudio:switchGroupId" value="1"/>
              <SupplementaryDescriptor schemeIdUri="urn:brdcst:3dAudio:presetGroupId" value="preset2"/>
              <Representation id="4" bandwidth="128000">
                    <baseURL>audio/jp4/128.mp4</BaseURL>
                    <SupplementaryDescriptor schemeIdUri="urn:brdcst:3dAudio:levelId" value="level4"/>
              </Representation>
        </AdaptationSet>
  </Period>
</MPD>
```

FIG. 12

```
<MPD>
  <Period>
        <AdaptationSet mimeType="audio/mp4" group="1">
              <SupplementaryDescriptor schemeIdUri="urn:brdcst:codecType" value= "mpegh"/>
              <Representation id="1" bandwidth="128000">
                    <baseURL>audio/jp1/128.mp4</BaseURL>
                    <SupplementaryDescriptor schemeIdUri="urn:brdcst:3dAudio:levelId" value= "level1"/>
                    <SubRepresentation id="11" subgroupSet="1">
                          <SupplementaryDescriptor schemeIdUri="urn:brdcst:3dAudio:groupId" value= "group1"/>
                          <SupplementaryDescriptor schemeIdUri="urn:brdcst:3dAudio:attribute" value= "channeldata"/>
                          <SupplementaryDescriptor schemeIdUri="urn:brdcst:3dAudio:switchGroupId" value= "0"/>
                          <SupplementaryDescriptor schemeIdUri="urn:brdcst:3dAudio:presetGroupId" value= "preset1"/>
                          <SupplementaryDescriptor schemeIdUri="urn:brdcst:3dAudio:presetGroupId" value= "preset2"/>
                    </SubRepresentation>
                    <SubRepresentation id="12" subgroupSet="2">
                          <SupplementaryDescriptor schemeIdUri="urn:brdcst:3dAudio:groupId" value= "group2"/>
                          <SupplementaryDescriptor schemeIdUri="urn:brdcst:3dAudio:attribute" value= "objectSound"/>
                          <SupplementaryDescriptor schemeIdUri="urn:brdcst:3dAudio:switchGroupId" value= "0"/>
                          <SupplementaryDescriptor schemeIdUri="urn:brdcst:3dAudio:presetGroupId" value= "preset1"/>
                          <SupplementaryDescriptor schemeIdUri="urn:brdcst:3dAudio:presetGroupId" value= "preset2"/>
                    </SubRepresentation>
              </Representation>
        </AdaptationSet>
        <AdaptationSet mimeType="audio/mp4" group="2">
              <SupplementaryDescriptor schemeIdUri="urn:brdcst:codecType" value= "mpegh"/>
              <Representation id="2" bandwidth="128000">
                    <baseURL>audio/jp2/128.mp4</BaseURL>
                    <SupplementaryDescriptor schemeIdUri="urn:brdcst:3dAudio:levelId" value= "level2"/>
                    <SubRepresentation id="21" subgroupSet="3">
                          <SupplementaryDescriptor schemeIdUri="urn:brdcst:3dAudio:groupId" value= "group3"/>
                          <SupplementaryDescriptor schemeIdUri="urn:brdcst:3dAudio:attribute" value= "objectLang1"/>
                          <SupplementaryDescriptor schemeIdUri="urn:brdcst:3dAudio:switchGroupId" value= "1"/>
                          <SupplementaryDescriptor schemeIdUri="urn:brdcst:3dAudio:presetGroupId" value= "preset1"/>
                    </SubRepresentation>
                    <SubRepresentation id="22" subgroupSet="4">
                          <SupplementaryDescriptor schemeIdUri="urn:brdcst:3dAudio:groupId" value= "group4"/>
                          <SupplementaryDescriptor schemeIdUri="urn:brdcst:3dAudio:attribute" value= "objectLang2"/>
                          <SupplementaryDescriptor schemeIdUri="urn:brdcst:3dAudio:switchGroupId" value= "1"/>
                          <SupplementaryDescriptor schemeIdUri="urn:brdcst:3dAudio:presetGroupId" value= "preset2"/>
                    </SubRepresentation>
              </Representation>
        </AdaptationSet>
  </Period>
</MPD>
```

FIG. 13 schemeIdUri IS DEFINED BY SupplementaryDescriptor AS FOLLOWS.

schemeIdUri="urn:brdcst:codecType" : INDICATES TYPE OF CODEC.
value : DESCRIBED AS "mpegh."

schemeIdUri="urn:brdcst:3dAudio:groupID" : IDENTIFIER OF GROUP. (VALUE OTHER THAN ZERO)

schemeIdUri="urn:brdcst:3dAudio:attribute" : ATTRIBUTE OF ENCODED DATA OF RELEVANT GROUP. (VALUE OTHER THAN ZERO)

schemeIdUri="urn:brdcst:3dAudio:switchGroupId : IDENTIFIER OF SWITCH GROUP TO WHICH RELEVANT GROUP BELONGS.
value: "0" DOES NOT BELONG TO ANY SWITCH GROUP.
value: OTHER THAN "0." INDICATES BELONGING SWITCH GROUP.

schemeIdUri="urn:brdcst:3dAUdio:presetGroupID" : IDENTIFIER OF PRESET GROUP TO WHICH RELEVANT GROUP BELONGS.

schemeIdUri="urn:brdcst:3dAudio:levelID": IDENTIFIER OF LEVEL CORRESPONDING TO IDENTIFIER OF TRACK FOR TRANSMITTING ENCODED DATA OF RELEVANT GROUP.

Leva

```
DEFINE level ASSIGNMENT.
Level assignment
   Level0 = track0
   Level1 = track1
   Level2 = track2
```

TRANSMISSION DEVICE, TRANSMISSION METHOD, RECEPTION DEVICE, AND RECEPTION METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

[This application is a U.S. National Phase of International Patent Application No. PCT/JP2015/075318 filed on Sep. 7, 2015, which claims priority benefit of Japanese Patent Application No. JP 2014-187085 filed in the Japan Patent Office on Sep. 12, 2014. Each of the above-referenced applications is hereby incorporated herein by reference in its entirety.] *The present reissue application is a broadening reissue of U.S. Pat. No. 10,878,828, issued Dec. 29, 2020, which is U.S. National Phase of International Patent Application No. PCT/JP2015/075318 filed on Sep. 7, 2015, which claims priority benefit of Japanese Patent Application No. JP 2014-187085 filed in the Japan Patent Office on Sep. 12, 2014. Each of the above-referenced applications is hereby incorporated herein by reference in its entirety.*

TECHNICAL FIELD

The present technology relates to a transmission device, a transmission method, a reception device, and a reception method, and more particularly relates to a transmission device and the like related to a technology for transmitting audio data of a plurality of types.

BACKGROUND ART

Conventionally, as a stereophonic (3D) sound technology, there has been a proposed technology for mapping encoded sample data with a speaker existing at an arbitrary location on the basis of metadata to render (for example, see Patent Document 1).

CITATION LIST

Patent Document

Patent Document 1: Japanese Patent Application National Publication (Laid-Open) No. 2014-520491

SUMMARY OF THE INVENTION

Problems to be Solved by the Invention

When object encoded data composed of encoded sample data and metadata is transmitted together with channel encoded data such as 5.1 channel and 7.1 channel, this may provide a sound reproduction with more realistic surrounding effect in a reception side.

An object of the present technology is to reduce a process load in the reception side when a plurality of types of encoded data is transmitted.

A concept of the present technology lies in a transmission device includes:

a transmitting unit configured to transmit a metafile having meta information used to acquire, in a reception device, a predetermined number of audio streams including a plurality of groups of encoded data; and an information inserting unit configured to insert, to the metafile, attribute information indicating each attribute of the encoded data of the plurality of groups.

Solutions to Problems

In the present technology, a transmitting unit transmits a metafile having meta information used to acquire, in a reception device, a predetermined number of audio streams including a plurality of groups of encoded data. For example, the encoded data of the plurality of groups may include one of or both of channel encoded data and object encoded data.

An information inserting unit inserts, to the metafile, attribute information indicating each attribute of the encoded data of the plurality of groups. For example, the metafile may be a media presentation description (MPD) file. In this case, for example, the information inserting unit may insert the attribute information to the metafile by using "Supplementary Descriptor."

Further, for example, the transmitting unit may transmit the metafile via an RF transmission path or a communication network transmission path. Further, for example, the transmitting unit may further transmit a container in a predetermined format having the predetermined number of audio streams including the plurality of groups of the encoded data. The container is an MP4, for example. According to the present technology report, the MP4 indicates an ISO base media file format (ISOBMFF) (ISO/IEC 14496-12:2012).

In this manner, according to the present technology, to a metafile having meta information used to acquire, in a reception device, a predetermined number of audio streams including a plurality of groups of encoded data, attribute information indicating each attribute of the encoded data of the plurality of groups is inserted. Thus, a reception side can easily recognize each attribute of the encoded data of the plurality of groups before the relevant encoded data is decoded, so that encoded data of a necessary group can be selectively decoded and used, and an a process load can be reduced.

Here, according to the present technology, for example, the information inserting unit may further insert, to the metafile, stream correspondence relation information indicating in which audio stream the encoded data of the plurality of groups is included respectively. In this case, for example, stream correspondence relation information may be information indicating a correspondence relation between group identifiers that identify the respective pieces of encoded data of the plurality of groups and identifiers that identify the respective streams of the predetermined number of audio streams. In this case, the reception side can easily recognize the audio stream including the encoded data of the necessary group and this can reduce the process load.

Further, another concept of the present technology lies in a reception device including:

a receiving unit configured to receive a metafile having meta information used to acquire, in the reception device, a predetermined number of audio streams including a plurality of groups of encoded data, the metafile including inserted attribute information that indicates each attribute of the encoded data of the plurality of groups; and a processing unit configured to process the predetermined number of audio streams on the basis of the attribute information.

According to the present technology, a receiving unit receives the metafile. The metafile includes meta information used to acquire, in the reception device, a predetermined number of audio streams including a plurality of groups of encoded data. For example, the encoded data of the plurality of groups may include one of or both of channel encoded data and object encoded data. To the metafile, attribute information indicating each attribute of the encoded data of the plurality of groups is inserted. A processing unit processes the predetermined number of audio streams on the basis of the attribute information.

In this manner, according to the present technology, the process on the predetermined number of audio streams is performed on the basis of the attribute information indicating each attribute of the encoded data of the plurality of groups inserted in the metafile. Thus, only the encoded data of the necessary group can be selectively decoded and used, and this can reduce the process load.

Here, according to the present technology, for example, the metafile may further include stream correspondence relation information indicating in which audio stream the encoded data of the plurality of groups is included respectively, and the processing unit may process the predetermined number of audio streams on the basis of the stream correspondence relation information as well as the attribute information. In this case, audio stream that includes the encoded data of the necessary group can be easily recognized, and this can reduce the process load.

Further, according to the present technology, for example, the processing unit may selectively perform a decode process on the audio stream including encoded data of a group having an attribute compatible with a speaker configuration and user selection information on the basis of the attribute information and the stream correspondence relation information.

Further, still another concept of the present technology lies in a reception device including:

a receiving unit configured to receive a metafile having meta information used to acquire, in the reception device, a predetermined number of audio streams including a plurality of groups of encoded data, the metafile including inserted attribute information indicating each attribute of the encoded data of the plurality of groups;

a processing unit configured to selectively acquire encoded data of a predetermined group from the predetermined number of audio streams on the basis of the attribute information, and reconfigure an audio stream including the encoded data of the predetermined group; and a stream transmitting unit configured to transmit the reconfigured audio stream to an external device.

According to the technology, a receiving unit receives the metafile. The metafile includes meta information used to acquire, in the reception device, a predetermined number of audio streams including a plurality of groups of encoded data. To the metafile, the attribute information indicating each attribute of the encoded data of the plurality of groups is inserted.

A processing unit selectively acquires the encoded data of a predetermined group from the predetermined number of audio stream on the basis of the attribute information, and an audio stream including the encoded data of the predetermined group is reconfigured. Then, a stream transmitting unit transmits the reconfigured audio stream to an external device.

In this manner, according to the present technology, on the basis of the attribute information, which is inserted in the metafile, that indicates each attribute of the encoded data of the plurality of groups, the encoded data of the predetermined group is selectively acquired from the predetermined number of audio streams, and an audio stream to be transmitted to an external device is reconfigured. The encoded data of the necessary group can be easily acquired, and this can reduce the process load.

Here, according to the present technology, for example, to the metafile, stream correspondence relation information indicating in which audio stream the encoded data of the plurality of groups is included respectively is further inserted, and the processing unit may selectively acquire the encoded data of the predetermined group from the predetermined number of audio streams on the basis of the stream correspondence relation information as well as the attribute information. In this case, the audio stream including the encoded data of the predetermined group can be easily recognized, and this can reduced the process load.

Effects of the Invention

According to the present technology, the process load in the reception side can be reduced when a plurality of types of encoded data is transmitted. Here, the effect described in this specification is only an example and does not set any limitation, and there may be additional effect.

BRIEF DESCRIPTION OF DRAWINGS

FIGS. 2(a) to 2(d) are diagrams illustrating an example of a relation between structures hierarchically arranged in an MPD file.

FIG. 8 is a diagram illustrating a correspondence relation or the like between the groups and tracks in a group division example (divided into four groups).

FIG. 10 is a diagram illustrating a correspondence relation or the like between the groups and the tracks in a group division example (divided into two groups).

FIG. 11 is a diagram illustrating a description example of an MPD file.

FIG. 12 is a diagram illustrating another description example of the MPD file.

FIG. 13 is a diagram illustrating an example of "schemeIdUri" defined by "SupplementaryDescriptor."

MODE FOR CARRYING OUT THE INVENTION

In the following, modes (hereinafter, referred to as "embodiments") for carrying out the invention will be described. It is noted that the descriptions will be given in the following order.

1. Embodiment
2. Modified Examples

1. Embodiment

[Overview of MPEG-DASH-Based Stream Delivery System]

First, an overview of an MPEG-DASH-based stream delivery system to which the present technology can be applied will be described.

Figure 1A:
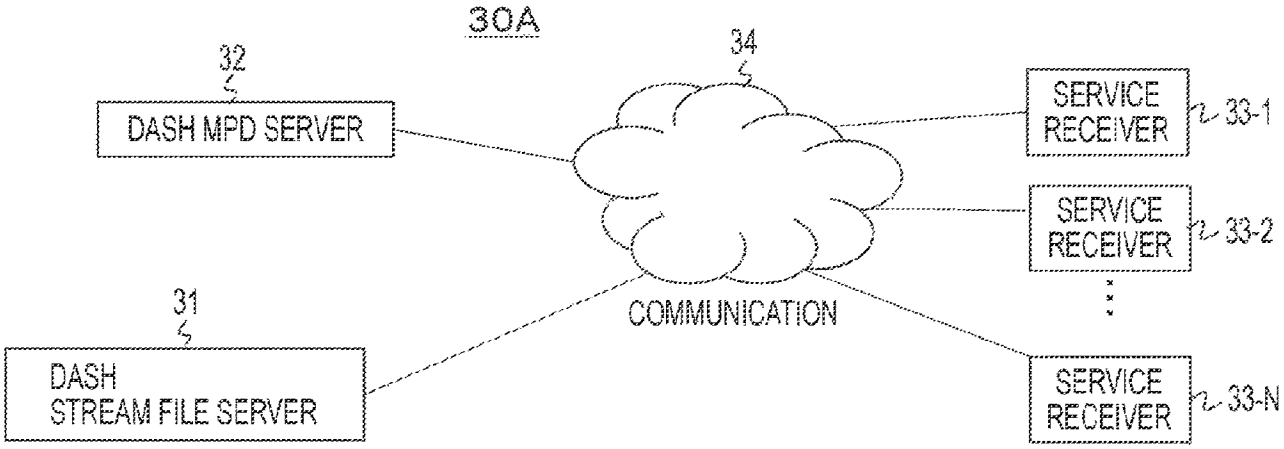
FIGS. 1(a) and 1(b) are block diagrams illustrating exemplary configurations of an MPEG-DASH-based stream delivery system.

FIG. 1(a) illustrates an exemplary configuration of an MPEG-DASH-based stream delivery system 30A. In this exemplary configuration, a media stream and an MPD file are transmitted via a communication network transmission path. The stream delivery system 30A is configured such that N service receivers 33-1, 33-2, . . . , and 33-N are connected to a DASH stream file server 31 and a DASH MPD server 32 via a content delivery network (CDN) 34.

The DASH stream file server 31 generates a stream segment (hereinafter, referred to appropriately as a "DASH segment") of a DASH specification on the basis of media data (video data, audio data, subtitle data, or the like) of predetermined content, and transmits the segment according to an HTTP request made from the service receiver. The DASH stream file server 31 may be a server dedicated for streaming and function as a web server as well.

Further, in response to a request of a segment of a predetermined stream transmitted from the service receiver 33 (33-1, 33-2, . . . , and 33-N) via the CDN 34, the DASH stream file server 31 transmits, via the CDN 34, the segment of the stream to the receiver as a source of the request. In this case, the service receiver 33 selects a stream of an optimal rate according to a state of a network environment in which a client is located with reference to a value of a rate described in the media presentation description (MPD) file, and makes a request.

The DASH MPD server 32 is a server that generates the MPD file for acquiring the DASH segment generated in the DASH stream file server 31. The MPD file is generated on the basis of content metadata received from a content management server (not illustrated) and an address (url) of the segment generated in the DASH stream file server 31. Here, the DASH stream file server 31 and the DASH MPD server 32 may physically be the same.

In an MPD format, each attribute is described using an element such as a representation (Representation) for each stream such as a video or an audio. For example, representations are divided for every plurality of video data streams having different rates, and each rate thereof is described in the MPD file. The service receiver 33 can select an optimal stream according to the state of the network environment in which the service receiver 33 is located in view of the value of the rate as described above.

Figure 1B:
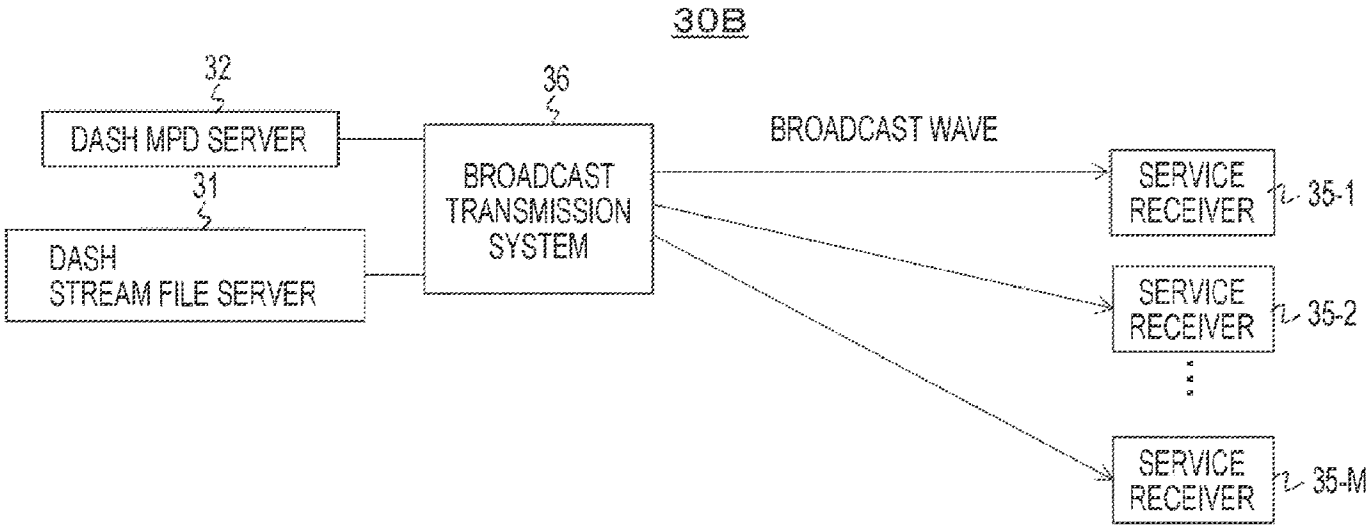

FIG. 1(b) illustrates an exemplary configuration of an MPEG-DASH-based stream delivery system 30B. In this exemplary configuration, the media stream and the MPD file are transmitted via an RF transmission path. The stream delivery system 30B is configured with a broadcast transmission system 36 connected to the DASH stream file server 31 and the DASH MPD server 32 and M service receivers 35-1, 35-2, . . . , and 35-M.

In the case of the stream delivery system 30B, the broadcast transmission system 36 transmits a stream segment (a DASH segment) of a DASH specification generated by the DASH stream file server 31 and an MPD file generated by the DASH MPD server 32 through a broadcast wave.

FIGS. 2(a) to 2(d) illustrate an example of a relation of structures hierarchically arranged in the MPD file. As illustrated in FIG. 2(a), a media presentation (Media Presentation) of the entire MPD file includes a plurality of periods delimited at time intervals. For example, a first period starts from a 0-th second, and a next period starts from a 100-th second.

As illustrated in FIG. 2(b), a period includes a plurality of representations (Representations). Among the plurality of representations, there is a group of representations, which are grouped according to an adaptation set (AdaptationSet), related to media streams of the same substance having different stream attributes, which are different rates for example.

As illustrated in FIG. 2(c), the representation includes segment info (SegmentInfo). In the segment info, as illustrated in FIG. 2(d), there are an initialization segment (Initialization Segment) and a plurality of media segments (Media Segment) in which information of segments (Segment) obtained by delimiting the period finer is described. The media segment includes, for example, information of an address (url) used to actually acquire segment data such as a video or an audio.

Further, stream switching can freely be performed among a plurality of representations grouped according to the adaptation set. Thus, it is possible to select a stream of an optimal rate according to a state of a network environment in which a service receiver is located and perform seamless delivery.

[Exemplary Configuration of Transceiving System]

Figure 3:
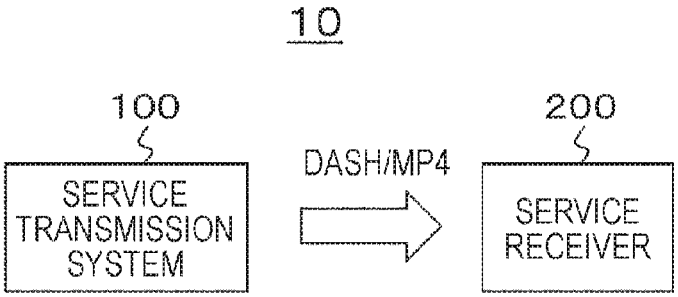
FIG. 3 is a block diagram illustrating an exemplary configuration of a transceiving system as an embodiment.

FIG. 3 illustrates an exemplary configuration of a transceiving system 10 as an embodiment. The transceiving system 10 is composed of a service transmission system 100 and a service receiver 200. In the transceiving system 10, the service transmission system 100 corresponds to the DASH stream file server 31 and DASH MPD server 32 in the above described stream delivery system 30A of FIG. 1(a). Further, in the transceiving system 10, the service transmission system 100 corresponds to the DASH stream file server 31, DASH MPD server 32, and broadcast transmission system 36 in the above described stream delivery system 30B of FIG. 1(b).

Further, in the transceiving system 10, the service receiver 200 corresponds to the service receivers 33 (33-1, 33-2, . . . , 33-N) in the above described stream delivery system 30A of FIG. 1(a). Further, in the transceiving system 10, the service receiver 200 corresponds to the service receivers 35 (35-1, 35-2, . . . , 35-M) in the above described stream delivery system 30B of FIG. 1(b).

The service transmission system 100 transmits a DASH/MP4, that is, an MPD file serving as a metafile and an MP4 including a media stream (a media segment) such as a video or an audio via the RF transmission path (see FIG. 1(b)) or the communication network transmission path (see FIG. 1(a)).

Figure 4:
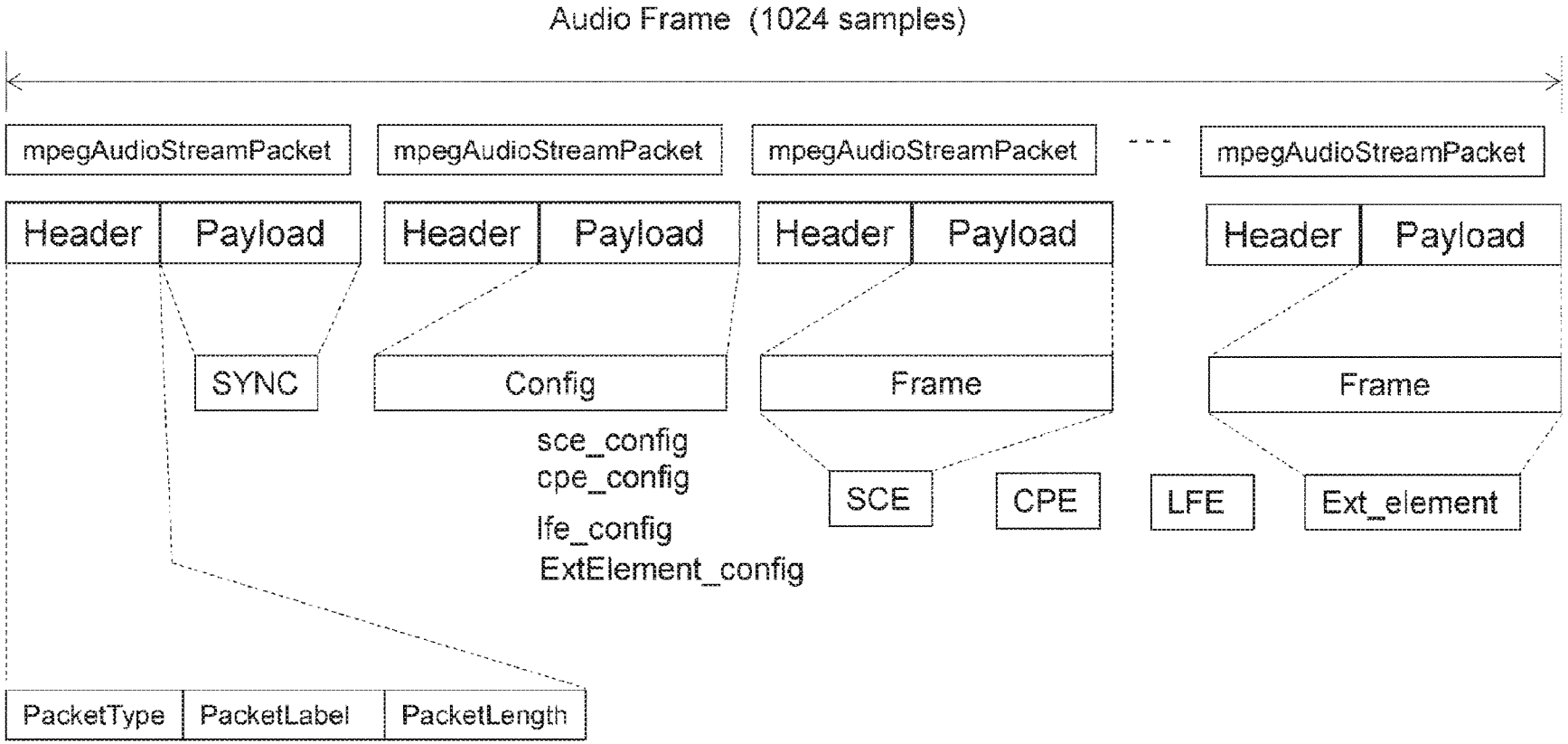
FIG. 4 is a diagram illustrating a structure of an audio frame (1024 samples) of 3D audio transmission data.

FIG. 4 illustrates a structure of an audio frame (1024 samples) in transmission data of 3D audio (MPEGH) handled in the present embodiment. The audio frame is configured with a plurality of MPEG audio stream packets (mpeg Audio Stream Packets). Each MPEG audio stream packet is configured with a header (Header) and a payload (Payload).

The header includes information such as a packet type (Packet Type), a packet label (Packet Label), and a packet length (Packet Length). Information defined by the packet type of the header is arranged in the payload. The payload information includes "SYNC" information corresponding to a synchronization start code, "Frame" information serving as actual data of 3D audio transmission data, and "Config" information indicating a configuration of the "Frame" information.

The "Frame" information includes channel encoded data and object encoded data configuring the 3D audio transmission data. Here, the channel encoded data is configured with encoded sample data such as a single channel element (SCE), a channel pair element (CPE), and a low frequency element (LFE). Further, the object encoded data is configured with the encoded sample data of the single channel element (SCE) and the metadata for mapping the encoded sample data with a speaker located at an arbitrary position and rendering the encoded sample data. The metadata is included as an extension element (Ext_element).

Figure 5:
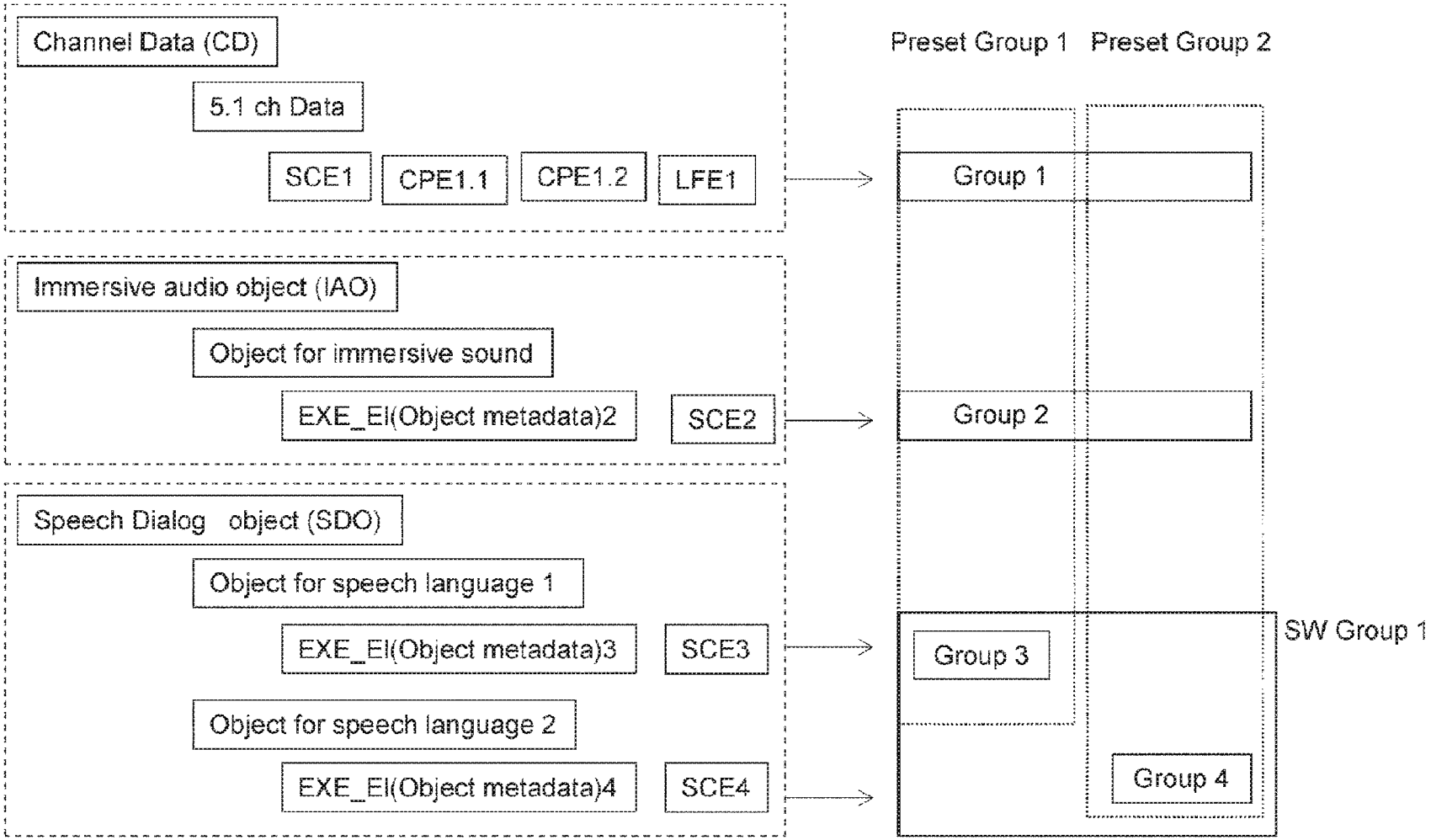
FIG. 5 is a diagram illustrating an exemplary configuration of the 3D audio transmission data.

FIG. 5 illustrates an exemplary configuration of the 3D audio transmission data. In this example, the 3D audio transmission data is composed of one piece of channel encoded data and two pieces of object encoded data. The piece of the channel encoded data is channel encoded data (CD) of 5.1 channel and configured with each piece of encoded sample data of SCE1, CPE1.1, CPE1.2, and LFE1.

The two pieces of object encoded data are encoded data of an immersive audio object (IAO) and a speech dialog object (SDO). The immersive audio object encoded data is object encoded data for an immersive sound and composed of encoded sample data SCE2 and metadata EXE_El (Object metadata) 2 which is used for mapping the encoded sample data SCE2 with a speaker located at an arbitrary position and rendering the encoded sample data SCE2.

The speech dialog object encoded data is object encoded data for a spoken language. In this example, there are pieces of the speech dialog object encoded data respectively corresponding to first and second languages. The speech dialog object encoded data corresponding to the first language is composed of encoded sample data SCE3 and metadata EXE_El (Object metadata) 3 which is used for mapping the encoded sample data SCE3 with a speaker located at an arbitrary position and rendering the encoded sample data SCE3. Further, the speech dialog object encoded data corresponding to the second language is composed of encoded sample data SCE4 and metadata EXE_El (Object metadata) 4 which is used for mapping the encoded sample data SCE4 with a speaker located at an arbitrary position and rendering the encoded sample data SCE4.

The encoded data is distinguished by a concept of a group (Group) according to the data type. In the illustrated example, the encoded channel data of 5.1 channel is defined as Group 1 (Group 1), the immersive audio object encoded data is defined as Group 2 (Group 2), the speech dialog object encoded data related to the first language is defined as Group 3 (Group 3), and the speech dialog object encoded data related to the second language is defined as Group 4 (Group 4).

Further, the groups which can be switched in the receiving side are registered in a switch group (SW Group) and encoded. In the illustrated example, Group 3 and Group 4 are registered in Switch Group 1 (SW Group 1). Further, some groups can be grouped as a preset group (preset Group) and be reproduced according to a use case. In the illustrated example, Group 1, Group 2, and Group 3 are grouped as Preset Group 1, and Group 1, Group 2, and Group 4 are grouped as Preset Group 2.

Referring back to FIG. 3, the service transmission system 100 transmits 3D audio transmission data including encoded data of a plurality of groups as described above with one track as one audio stream or with multiple tracks as multiple audio streams.

Figure 6A:
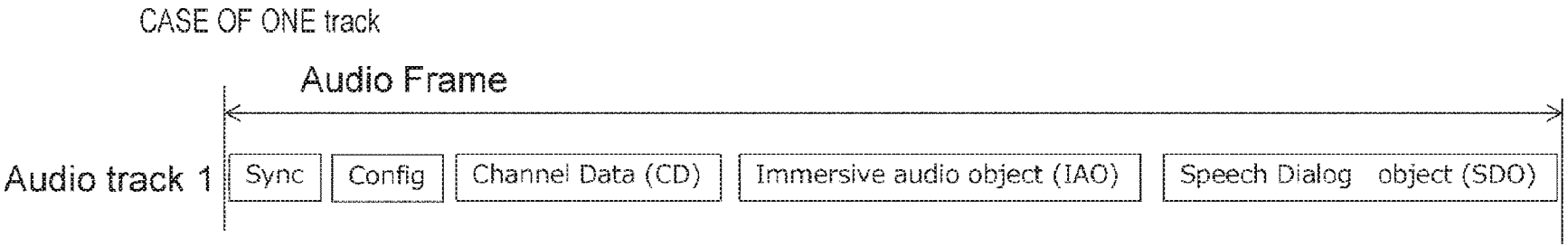
FIGS. 6(a) and 6(b) are diagrams schematically illustrating exemplary configurations of the audio frame in a case of transmitting the 3D audio transmission data with one track (one audio stream) and the audio frame in a case of transmitting with multiple tracks (more than one audio streams).

FIG. 6(a) schematically illustrates an exemplary configuration of an audio frame of a case that data is transmitted with one track (one audio stream) regarding the exemplary configuration of the 3D audio transmission data in FIG. 5. In this case, Audio track 1 includes "SYNC" information and "Config" information as well as channel encoded data (CD), immersive audio object encoded data (IAO), and speech dialog object encoded data (SDO).

Figure 6B:
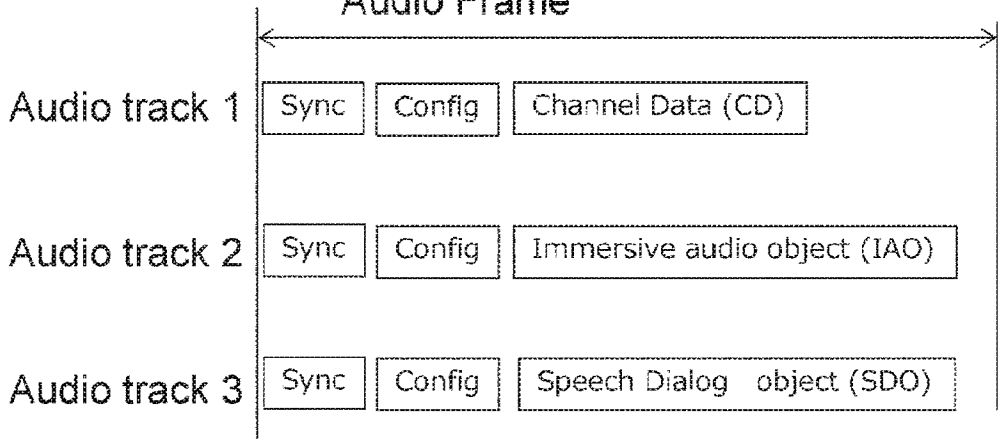

FIG. 6(b) schematically illustrates an exemplary configuration of an audio frame of a case that data is transmitted with multiple tracks (multiple audio streams), with three tracks in this example, regarding the exemplary configuration of the 3D audio transmission data in FIG. 5. In this case, Audio track 1 includes "SYNC" information and "Config" information as well as channel encoded data (CD). Further, Audio track 2 includes "SYNC" information and "Config" information as well as immersive audio object encoded data (IAO). Further, Audio track 3 includes "SYNC" information and "Config" information as well as speech dialog object encoded data (SDO).

Figure 7:
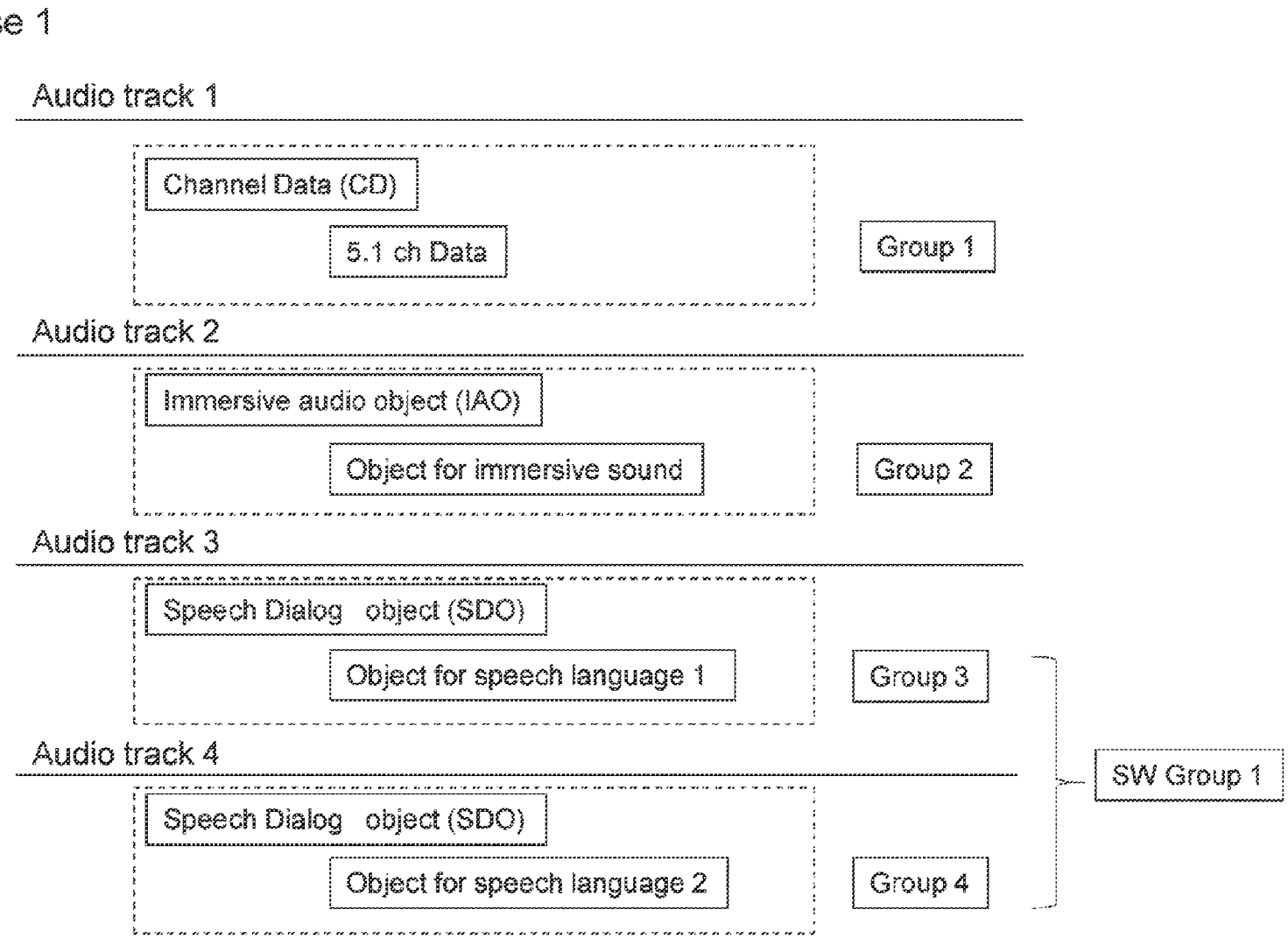
FIG. 7 is a diagram illustrating a group division example of a case of transmitting with four tracks in the exemplary configuration of the 3D audio transmission data.

FIG. 7 illustrates a group division example of a case that data is transmitted with four tracks regarding the exemplary configuration of the 3D audio transmission data in FIG. 5. In this case, Audio track 1 includes the channel encoded data (CD) defined as Group 1. Further, Audio track 2 includes the immersive audio object encoded data (IAO) defined as Group 2. Further, Audio track 3 includes the speech dialog object encoded data (SDO) of the first language defined as Group 3. Further, Audio track 4 includes the speech dialog object encoded data (SDO) of the second language defined as Group 4.

FIG. 8 illustrates a correspondence relation between groups of group division example (divided into four groups) in FIG. 7 and audio tracks or the like. Here, the group ID (group ID) is an identifier to distinguish a group. The attribute (attribute) indicates an attribute of the encoded data of each group. The switch group ID (switch Group ID) is an identifier to distinguish a switching group. The preset group ID (preset Group ID) is an identifier to distinguish a preset group. The track ID (track ID) is an identifier to distinguish an audio track.

The illustrated correspondence relation indicates that the encoded data of Group 1 is channel encoded data which does not compose a switch group and is included in Audio track 1. Further, the illustrated correspondence relation indicates that the encoded data of Group 2 is object encoded data for an immersive sound (immersive audio object encoded data) which does not compose a switch group and is included in Audio track 2.

Further, the illustrated correspondence relation indicates that the encoded data of Group 3 is object encoded data for spoken language (speech dialog object encoded data) of the first language, which composes switch group 1 and is included in Audio track 3. Further, the illustrated correspondence relation indicates that the encoded data of Group 4 is object encoded data for a spoken language (speech dialog object encoded data) of the second language, which composes switch group 1 and is included in Audio track 4.

Further, the illustrated correspondence relation indicates that Preset Group 1 includes Group 1, Group 2, and Group 3. Further, the illustrated correspondence relation indicates that Preset Group 2 includes Group 1, Group 2, and Group 4.

Figure 9:
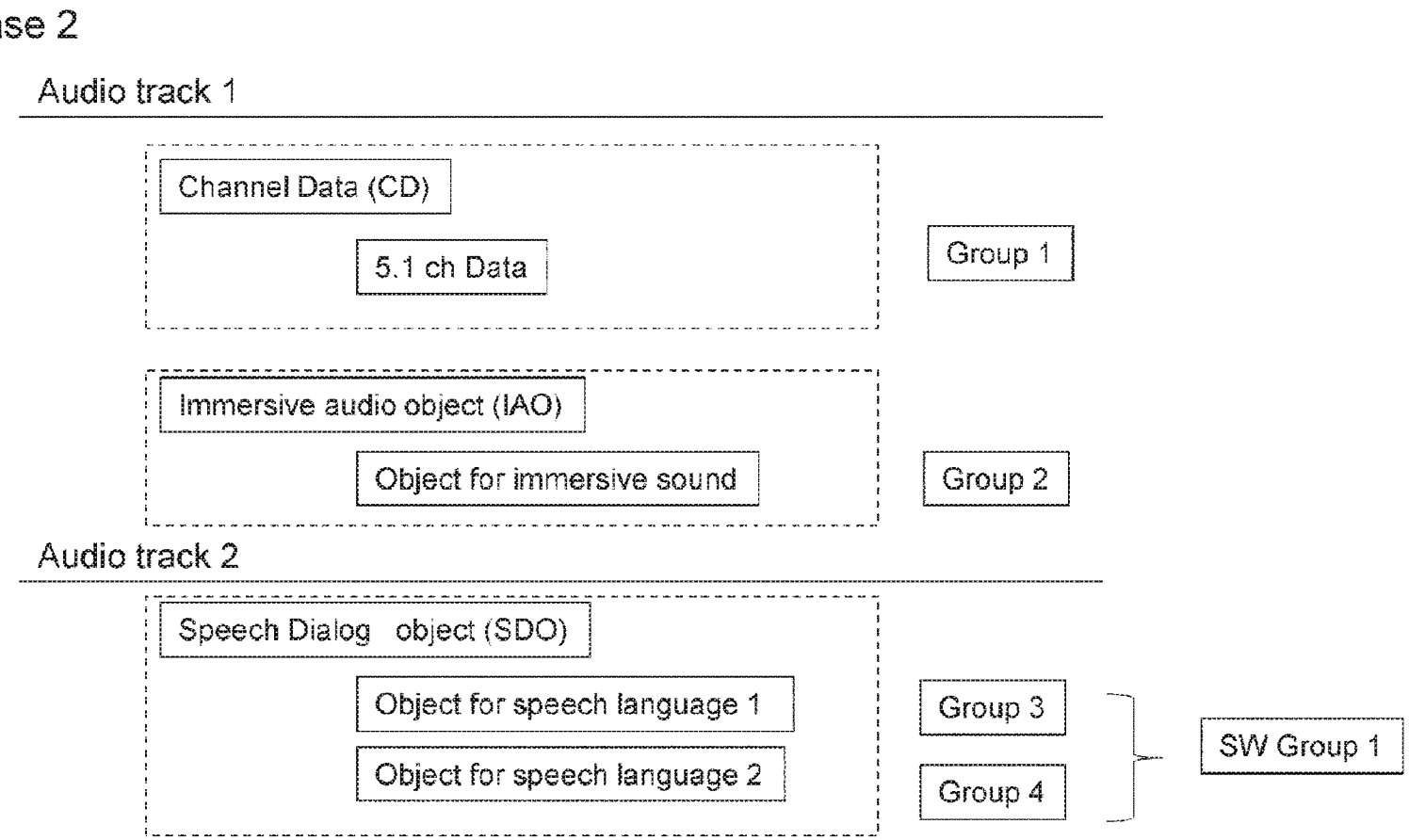
FIG. 9 is a diagram illustrating a group division example of a case of transmitting with two tracks in the exemplary configuration of the 3D audio transmission data.

FIG. 9 illustrates a group division example of a case that data is transmitted with two tracks regarding the exemplary configuration of the 3D audio transmission data of FIG. 5. In this case, Audio track 1 includes the channel encoded data (CD) defined as Group 1 and the immersive audio object encoded data (IAO) defined as Group 2. Further, Audio track 2 includes the speech dialog object encoded data (SDO) of the first language defined as Group 3 and the speech dialog object encoded data (SDO) of the second language defined as Group 4.

FIG. 10 illustrates a correspondence relation between the groups of the group division example (divided into two groups) of FIG. 9 and sub streams. The illustrated correspondence relation indicates that the encoded data of Group 1 is the channel encoded data, which does not compose a switch group and is included in Audio track 1. Further, the illustrated correspondence relation indicates that the encoded data of Group 2 is object encoded data for an immersive sound (immersive audio object encoded data), which does not compose a switch group and is included in Audio track 1.

Further, the illustrated correspondence relation indicates that the encoded data of Group 3 is object encoded data for a spoken language (speech dialog object encoded data) of the first language, which composes switch group 1 and is included in Audio track 2. Further, the illustrated correspondence relation indicates that the encoded data of Group 4 is object encoded data for a spoken language (speech dialog object encoded data) of the second language, which composes switch group 1 and is included in Audio track 2.

Further, the illustrated correspondence relation indicates that Preset Group 1 includes Group 1, Group 2, and Group 3. Further, the illustrated correspondence relation indicates that Preset Group 2 includes Group 1, Group 2, and Group 4.

Referring back to FIG. 3, the service transmission system 100 inserts, to the MPD file, attribute information that indicates each attribute of encoded data of a plurality of groups included in the 3D audio transmission data. Further, the service transmission system 100 inserts, to the MPD file, stream correspondence relation information that indicates which audio track (audio stream) the encoded data of the plurality of groups is included respectively. In the present embodiment, the stream correspondence relation information is assumed as information that indicates a correspondence relation between group IDs and track IDs, for example.

The service transmission system 100 inserts the attribute information and stream correspondence relation information to the MPD file. In the present embodiment in which "SupplementaryDescriptor" can newly define schemeIdUri" as a broadcast or any other application, separately from an existing definition in an existing standard, the service transmission system 100 inserts the attribute information and stream correspondence relation information to the MPD file by using "SupplementaryDescriptor."

FIG. 11 illustrates a description example of the MPD file corresponding to the group division example (divided into four groups) of FIG. 7. FIG. 12 illustrates a description example of the MPD file corresponding to the group division example (divided into two groups) of FIG. 9. Here, in purpose of simplifying the description, an example in which only the information related to the audio stream is described; however, in actual, information related to other media streams such as a video stream is also described. FIG. 13 is a diagram illustrating an example of "schemeIdUri" defined by "SupplementaryDescriptor."

Firstly, the description example of the MPD file of FIG. 11 will be explained. A description of "<AdaptationSet mimeType="audio/mp4" group="1">" indicates that there is an adaptation set (AdaptationSet) for an audio stream, the audi stream is supplied in an MP4 file structure, and Group 1 is allocated.

A description of "<SupplementaryDescriptor schemeIdUri="urn:brdcst:codecType" value="mpegh"/> indicates that a codec of the audio stream is MPEGH (3D audio). As illustrated in FIG. 13, "schemeIdUri="urn:brdcst:codecType"" indicates a type of a codec. In this example, "mpegh" is indicated.

A description of "<SupplementaryDescriptor schemeIdUri="urn:brdcst:3dAudio:groupId" value="group1"/>" indicates that encoded data of Group 1 "group1" is included in the audio stream. As illustrated in FIG. 13, "schemeIdUri="urn:brdcst:3dAudio:groupId"" indicates a group identifier.

A description of "<SupplementaryDescriptor schemeIdUri="urn:brdcst:3dAudio:attribute" value="channeldata"/>" indicates that the encoded data of Group 1 "group1" is channel encoded data "channeldata." As illustrated in FIG. 13, "schemeIdUri="urn:brdcst:3dAudio:attribute"" indicates an attribute of encoded data of a corresponding group.

A description of "<SupplementaryDescriptor schemeIdUri="urn:brdcst:3dAudio:switchGroupId" value="0"/>" indicates that the encoded data of Group 1 "group1" does not belong to any switch group. As illustrated in FIG. 13, "schemeIdUri="urn:brdcst:3dAudio:switchGroupId"" indicates an identifier of a switch group to which the corresponding group belongs. For example, when "value" is "0," this indicates that the corresponding group does not belong to any switch group. When "value" is a value other than "0," this indicates a belonging switch group.

A description of "<SupplementaryDescriptor schemeIdUri="urn:brdcst:3dAudio:presetGroupId" value="preset1"/>" indicates that the encoded data of Group 1 "group1" belongs to Preset Group 1 "preset1." Further, a description of "<SupplementaryDescriptor schemeIdUri="urn:brdcst:3dAudio:presetGroupId"

value="preset2"/>" indicates that the encoded data of Group 1 "group1" belongs to Preset Group 2 "preset2." As illustrated in FIG. 13, "schemeIdUri="urn:brdcst:3dAudio:presetGroupId"" indicates an identifier of a preset group to which the corresponding group belongs.

A description of "<Representation id="1" bandwidth="128000">" indicates that there is an audio stream having a bit rate of 128 kbps, which includes the encoded data of Group 1 "group1" in an adaptation set of Group 1, as a representation identified by "Representation id="1"." Then, a description of "<baseURL>audio/jp1/128.mp4</BaseURL>" indicates that a location destination of the audio stream is "audio/jp1/128.mp4."

A description of "<SupplementaryDescriptor schemeIdUri="urn:brdcst:3dAudio:levelId" value="level1"/>" indicates that the audio stream is transmitted with a track corresponding to Level 1 "level1." As illustrated in FIG. 13, "schemeIdUri="urn:brdcst:3dAudio:levelId" indicates an identifier of a level corresponding to an identifier of a track to transmit an audio stream including encoded data of the corresponding group. Here, a correspondence between the track identifiers (track ID) and level identifiers (level ID) is described in a "moov" box for example, as described in the following.

Further, a description of "<AdaptationSet mimeType="audio/mp4" group="2">" indicates that there is an adaptation set (AdaptationSet) for the audio stream, the audi stream is supplied in an MP4 file structure, and Group 2 is allocated.

A description of "<SupplementaryDescriptor schemeIdUri="urn:brdcst:codecType" value="mpegh"/> indicates that a codec of the audio stream is "MPEGH (3D audio)." A description of "<SupplementaryDescriptor schemeIdUri="urn:brdcst:3dAudio:groupId" value="group2"/>" indicates that encoded data of Group 2 "group2" is included in the audio stream.

A description of "<SupplementaryDescriptor schemeIdUri="urn:brdcst:3dAudio:attribute" value="objectSound"/>" indicates that the encoded data of Group 2 "group2" is object encoded data "objectSound" for an immersive sound. A description of "<SupplementaryDescriptor schemeIdUri="urn:brdcst:3dAudio:switchGroupId" value="0"/>" indicates that the encoded data of Group 2 "group2" does not belong to any switch group.

A description of "<SupplementaryDescriptor schemeIdUri="urn:brdcst:3dAudio:presetGroupId" value="preset1"/>" indicates that the encoded data of Group 2 "group2" belongs to Preset Group 1 "preset1." A description of "<SupplementaryDescriptor schemeIdUri="urn:brdcst:3dAudio:presetGroupId" value="preset2"/>" indicates that the encoded data of Group 2 "group2" belongs to Preset Group 2 "preset2."

A description of "<Representation id="2" bandwidth="128000">" indicates that, there is an audio stream having a bit rate of 128 kbps, which includes the encoded data of Group 2 "group2" in an adaptation set of Group 2, as a representation identified by "Representation id="2"." Then, a description of "<baseURL>audio/jp2/128.mp4</BaseURL>" indicates that a location destination of the audio stream is "audio/jp2/128.mp4." Then, a description of "<SupplementaryDescriptor schemeIdUri="urn:brdcst:3dAudio:levelId" value="level2"/>" indicates that the audio stream is transmitted with a track corresponding to Level 2 "level2."

Further, a description of "<AdaptationSet mimeType="audio/mp4" group="3">" indicates that there is an adaptation set (AdaptationSet) corresponding to the audio stream, the audi stream is supplied in an MP4 file structure, and Group 3 is allocated.

A description of "<SupplementaryDescriptor schemeIdUri="urn:brdcst:codecType" value="mpegh"/> indicates that a codec of the audio stream is "MPEGH (3D audio)." A description of "<SupplementaryDescriptor schemeIdUri="urn:brdcst:3dAudio:groupId" value="group3"/>" indicates that encoded data of Group 3 "group3" is included in the audio stream. A description of "<SupplementaryDescriptor schemeIdUri="urn:brdcst:3dAudio:attribute" value="objectLang1"/>" indicates that the encoded data of Group 3 "group3" is object encoded data "objectLang1" for a spoken language of the first language.

A description of "<SupplementaryDescriptor schemeIdUri="urn:brdcst:3dAudio:switchGroupId" value="1"/>" indicates that the encoded data of Group 3 "group3" belongs to switch group 1 (switch group 1). A description of "<SupplementaryDescriptor schemeIdUri="urn:brdcst:3dAudio:presetGroupId" value="preset1"/>" indicates that the encoded data of Group 3 "group3" belongs to Preset Group 1 "preset1."

A description of "<Representation id="3" bandwidth="128000">" indicates that there is an audio stream having a bit rate of 128 kbps, which includes the encoded data of Group 3 "group3" in an adaptation set of Group 3, as a representation identified by "Representation id="3"." Then, a description of "<baseURL>audio/jp3/128.mp4</BaseURL>" indicates that a location destination of the audio stream is "audio/jp3/128.mp4." Then, a description of "<SupplementaryDescriptor schemeIdUri="urn:brdcst:3dAudio:levelId" value="level3"/>" indicates that the audio stream is transmitted with a track corresponding to Level 3 "level3."

Further, a description of "<AdaptationSetmimeType="audio/mp4" group="4">" indicates that there is an adaptation set (AdaptationSet) corresponding to an audio stream, the audi stream is supplied in an MP4 file structure, and Group 4 is allocated.

A description of "<SupplementaryDescriptor schemeIdUri="urn:brdcst:codecType" value="mpegh"/> indicates that a codec of the audio stream is "MPEGH (3D audio)." A description of "<SupplementaryDescriptor schemeIdUri="urn:brdcst:3dAudio:groupId" value="group4"/>" indicates that encoded data of Group 4 "group4" is included in the audio stream. A description of "<SupplementaryDescriptor schemeIdUri="urn:brdcst:3dAudio:attribute" value="objectLang2"/>" indicates that the encoded data of Group 4 "group4" is object encoded data "objectLang2" for a spoken language of the second language.

A description of "<SupplementaryDescriptor schemeIdUri="urn:brdcst:3dAudio:switchGroupId" value="1"/>" indicates that the encoded data of Group 4 "group4" belongs to switch group 1 (switch group 1). A description of "<SupplementaryDescriptor schemeIdUri="urn:brdcst:3dAudio:presetGroupId" value="preset2"/>" indicates that the encoded data of Group 4 "group4" belongs to Preset Group 2 "preset2."

A description of "<Representation id="4" bandwidth="128000">" indicates that there is an audio stream having a bit rate of 128 kbps, which includes the encoded data of Group 4 "group4" in an adaptation set of Group 4, as a representation identified by "Representation id="4"." Then, a description of "<baseURL>audio/jp4/128.mp4</BaseURL>" indicates that a location destination of the audio stream is "audio/jp4/128.mp4." Then, a description of "<SupplementaryDescriptor schemeIdUri="urn:brdcst:3dAudio:levelId" value="level4"/>" indicates that the audio stream is transmitted with a track corresponding to Level 4 "level4."

Next, the description example of the MPD file of FIG. 12 will be explained. A description of "<AdaptationSet mimeType="audio/mp4" group="1">" indicates that there is an adaptation set (AdaptationSet) of an audio stream, the audi stream is supplied in an MP4 file structure, and Group 1 is allocated. Then, a description of "<SupplementaryDescriptor schemeIdUri="urn:brdcst:codecType" value="mpegh"/> indicates that a codec of the audio stream is "MPEGH (3D audio)."

A description of "<Representation id="1" bandwidth="128000">" indicates that there is an audio stream having a bit rate of 128 kbps in an adaptation set of Group 1, as a representation identified by "Representation id="1"." Then, a description of "<baseURL>audio/jp1/128.mp4</BaseURL>" indicates that a location destination of the audio stream is "audio/jp1/128.mp4." Further, a description of "<SupplementaryDescriptor schemeIdUri="urn:brdcst:3dAudio:levelId" value="level1"/>" indicates that the audio stream is transmitted with a track corresponding to Level 1 "level1."

A description of "<SubRepresentation id="11" subgroupSet="1">" indicates that there is a sub-representation identified by "SubRepresentation id="11"" in a representation identified by "Representation id="1"," and sub-group set 1 is allocated.

A description of "<SupplementaryDescriptor schemeIdUri="urn:brdcst:3dAudio:groupId" value="group1"/>" indicates that encoded data of Group 1 "group1" is included in the audio stream. A description of "<SupplementaryDescriptor schemeIdUri="urn:brdcst:3dAudio: attribute" value="channeldata"/>" indicates that the encoded data of Group 1 "group1" is channel encoded data "channeldata."

A description of <SupplementaryDescriptor schemeIdUri="urn:brdcst:3dAudio:switchGroupId" value="0"/>" indicates that the encoded data of Group 1 "group1" does not belong to any switch group. A description of "<SupplementaryDescriptor schemeIdUri="urn:brdcst:3dAudio:presetGroupId" value="preset1"/>" indicates that the encoded data of Group 1 "group1" belongs to Preset Group 1 "preset1." Further, a description of "<SupplementaryDescriptor schemeIdUri="urn:brdcst:3dAudio:presetGroupId" value="preset2"/>" indicates that the encoded data of Group 1 "group1" belongs to Preset Group 2 "preset2."

A description of "<SubRepresentation id="12" subgroupSet="2">" indicates that there is a sub-representation identified by "SubRepresentation id="12"" in a representation identified by "Representation id="1"," and sub-group set 2 is allocated.

A description of "<SupplementaryDescriptor schemeIdUri="urn:brdcst:3dAudio:groupId" value="group2"/>" indicates that encoded data of Group 2 "group2" is included in an audio stream. A description of "<SupplementaryDescriptor schemeIdUri="urn:brdcst:3dAudio: attribute" value="objectSound"/>" indicates that the encoded data of Group 2 "group2" is object encoded data "objectSound" for an immersive sound.

A description of "<SupplementaryDescriptor schemeIdUri="urn:brdcst:3dAudio:switchGroupId" value="0"/>" indicates that the encoded data of Group 2 "group2" does not belong to any switch group. A description of "<SupplementaryDescriptor schemeIdUri="urn:brdcst:3dAudio:presetGroupId" value="preset1"/>" indicates that the encoded data of Group 2 "group2" belongs to Preset Group 1 "preset1." A description of "<SupplementaryDescriptor schemeIdUri="urn:brdcst:3dAudio:presetGroupId" value="preset2"/>" indicates that the encoded data of Group 2 "group2" belongs to Preset Group 2 "preset2."

Further, a description of "<AdaptationSet mimeType="audio/mp4" group="2">" indicates that there is an adaptation set (AdaptationSet) corresponding to an audio stream, the audi stream is supplied in an MP4 file structure, and Group 2 is allocated. Then, a description of "<SupplementaryDescriptor schemeIdUri="urn:brdcst:codecType" value="mpegh"/> indicates that a codec of the audio stream is "MPEGH (3D audio)."

A description of "<Representation id="2" bandwidth="128000">" indicates that there is an audio stream having a bit rate of 128 kbps in an adaptation set of Group 1, as a representation identified by "Representation id="2"." Then, a description of "<baseURL>audio/jp2/128.mp4</BaseURL>" indicates that a location destination of the audio stream is "audio/jp2/128.mp4." Further, a description of "<SupplementaryDescriptor schemeIdUri="urn:brdcst:3dAudio:levelId" value="level2"/>" indicates that the audio stream is transmitted with a track corresponding to Level 2 "level2."

A description of "<SubRepresentation id="21" subgroupSet="3">" indicates that there is a sub-representation identified by "SubRepresentation id="21"" in a representation identified by "Representation id="2"" and sub-group set 3 is allocated.

A description of "<SupplementaryDescriptor schemeIdUri="urn:brdcst:3dAudio:groupId" value="group3"/>" indicates that encoded data of Group 3 "group3" is included in the audio stream. A description of "<SupplementaryDescriptor schemeIdUri="urn:brdcst:3dAudio:attribute" value="objectLang1"/>" indicates that the encoded data of Group 3 "group3" is object encoded data "objectLang1" for a spoken language of the first language.

A description of "<SupplementaryDescriptor schemeIdUri="urn:brdcst:3dAudio:switchGroupId" value="1"/>" indicates that the encoded data of Group 3 "group3" belongs to switch group 1 (switch group 1). A description of "<SupplementaryDescriptor schemeIdUri="urn:brdcst:3dAudio:presetGroupId" value="preset1"/>" indicates that the encoded data of Group 3 "group3" belongs to Preset Group 1 "preset1."

A description of "<SubRepresentation id="22" subgroupSet="4">" indicates that there is a sub-representation identified by "SubRepresentation id="22"" in a representation identified by "Representation id="2"" and sub-group set 4 is allocated.

A description of "<SupplementaryDescriptor schemeIdUri="urn:brdcst:3dAudio:groupId" value="group4"/>" indicates that encoded data of Group 4 "group4" is included in the audio stream. A description of "<SupplementaryDescriptor schemeIdUri="urn:brdcst:3dAudio:attribute" value="objectLang2"/>" indicates that the encoded data of Group 4 "group4" is object encoded data "objectLang2" for a spoken language of the second language.

A description of "<SupplementaryDescriptor schemeIdUri="urn:brdcst:3dAudio:switchGroupId" value="1"/>" indicates that the encoded data of Group 4 "group4" belongs to switch group 1 (switch group 1). A description of "<SupplementaryDescriptor schemeIdUri="urn:brdcst:3dAudio:presetGroupId"

value="preset2"/>" indicates that the encoded data of Group 4 "group4" belongs to Preset Group 2 "preset2."

Figures 14A, 14B, 14C:
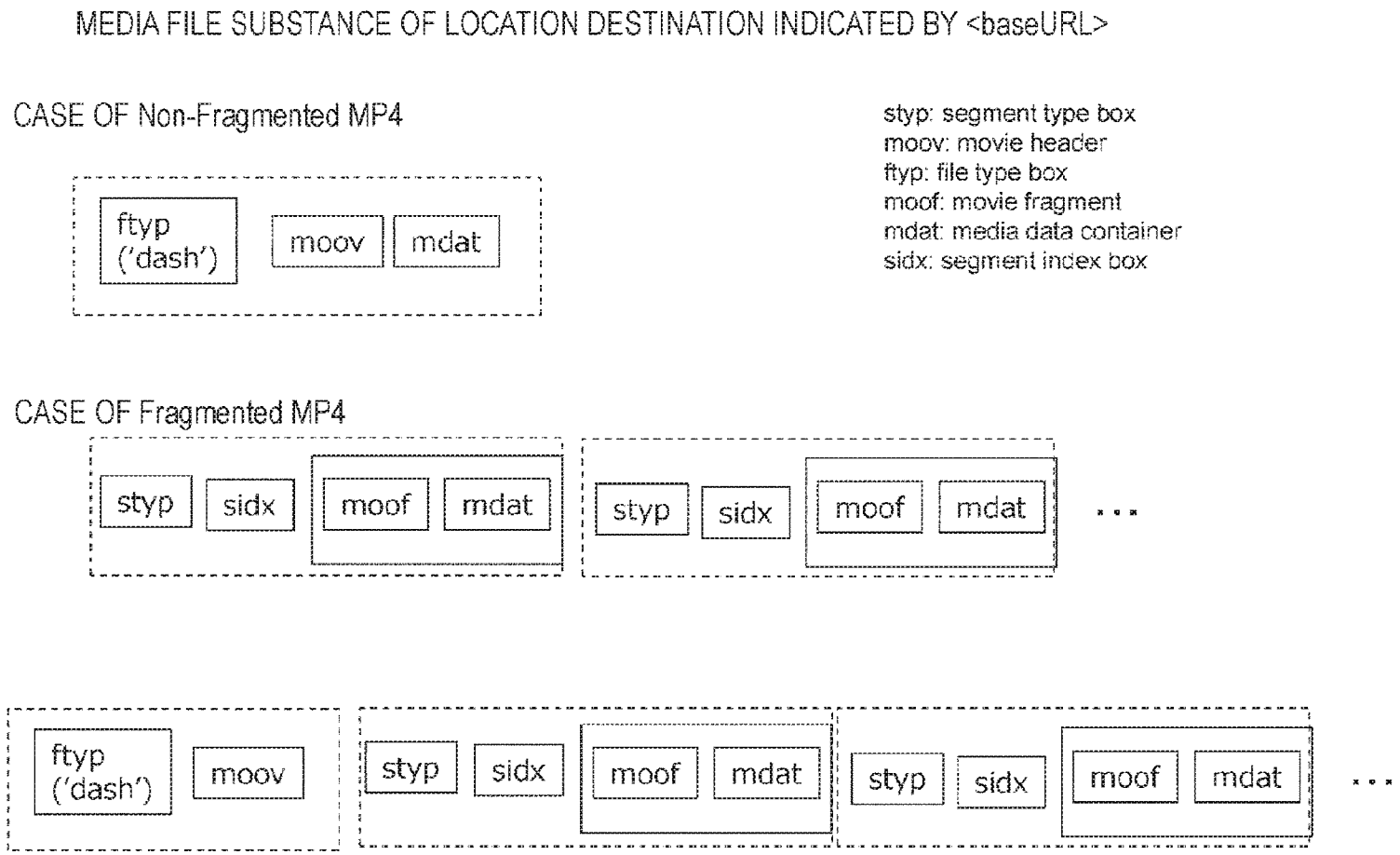
FIGS. 14(a) to 14(c) are diagrams for explaining a media file substance of a location destination indicated by "<baseURL>."

In the following, a media file substance of a location destination indicated by "<baseURL>," that is, a file contained in each audio track, will be described. In a case of a non-fragmented MP4 (Non-Fragmented MP4), for example, a media file substance is sometimes defined as "url 1" as illustrated in FIG. 14(a). In this case, a "ftyp" box describing a file type is first arranged. The "ftyp" box indicates that a file is a non-fragmented MP4 file. Subsequently, a "moov" box and a "mdat" box are arranged. The "moov" box includes all metadata, for example, header information of each track, a meta description of a content substance, time information, and the like. The "mdat" box includes a media data body.

Further, in a case of a fragmented MP4 (Fragmented MP4), for example, a media file substance is sometimes defined as "url 2" as illustrated in FIG. 14(b). In this case, a "styp" box describing a segment type is first arranged. Then, a "sidx" box describing a segment index is arranged. Subsequently, a predetermined number of movie fragments (Movie Fragment) are arranged. Here, the movie fragment is configured with a "moof" box including control information and a "mdat" box including a media data body. Since a fragment obtained by fragmenting a transmission media is included in the "mdat" box of one movie fragment, the control information included in the "moof" box is control information related to the fragment. The "styp," "sidx," "moof," and "mdat" are units that compose a segment.

Further, a combination of the above described "url 1" and "url 2" is also considered. In this case, for example, "url 1" may be set as an initialization segment, and "url 1" and "url 2" may be set as an MP4 of one service. Alternatively, "url 1" and "url 2" may be combined into one and defined as "url 3" as illustrated in FIG. 14(c).

Figures 15A, 15B:
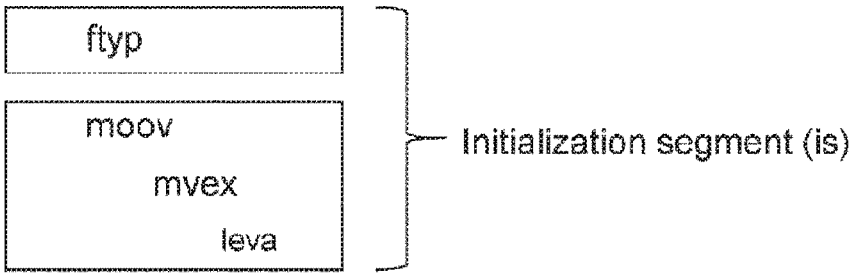
FIGS. 15(a) and 15(b) are diagrams for explaining a description of a correspondence between track identifiers (track ID) and level identifiers (level ID) in "moov" box.

As described above, in the "moov" box, a correspondence between track identifiers (track ID) and level identifiers (level ID) is written. As illustrated in FIG. 15(a), the "ftyp" box and "moov" box compose an initialization segment (Initialization segment). In the "moov" box, there is a "mvex" box and there is further a "leva" box in the "mvex" box.

As illustrated in FIG. 15(b), in the "leva" box, a correspondence between track identifiers (track ID) and level identifiers (level ID) is defined. In the illustrated example, "level0" is associated with "track0," "level1" is associated with "track1," and "level2" is associated with "track2."

Figure 16A:
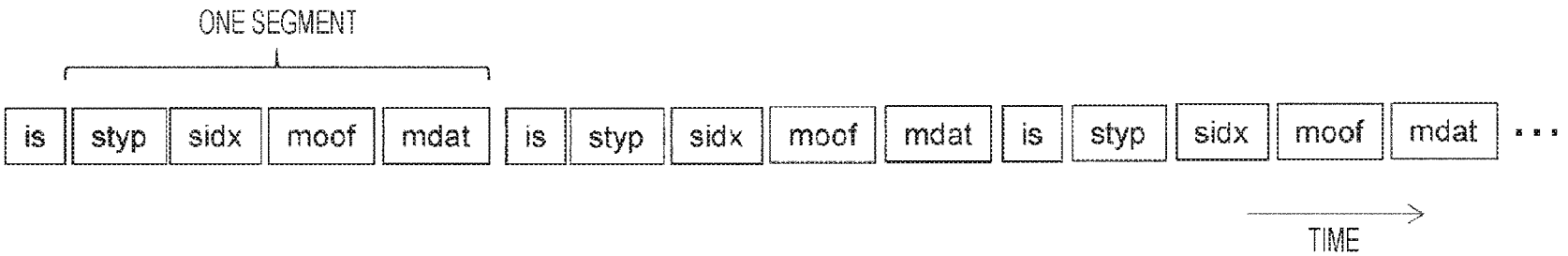
FIGS. 16(a) and 16(b) are diagrams illustrating a transmission example or the like of each box in a case of a transmission system.

FIG. 16(a) illustrates an example of transmitting each box in a case of a broadcast system. One segment is configured with a first initialization segment (is), following "styp," following "sidx" box, and following predetermined number of movie fragments (configured with a "moof" box and a "mdat" box). In the illustrated example, the predetermined number is one.

Figure 16B:
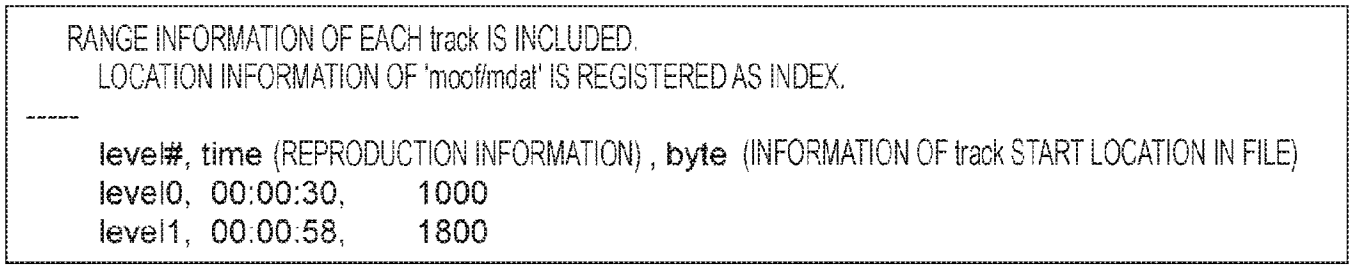

As described above, in the "moov" box composing the initialization segment (is), a correspondence between track identifiers (track ID) and level identifiers (level ID) is written. Further, as illustrated in FIG. 16(b), in the "sidx" box, each track is defined by a level (level) and there is registered range information of each track. In other words, corresponding to each level, reproduction time information and start location information of a track in a file are registered. In the reception side, regarding the audio, an audio stream of a desired audio track can be selectively extracted on the basis of the range information.

Referring back to FIG. 3, the service receiver 200 receives, from the service transmission system 100, a DASH/MP4, which is an MP4 including an MPD file as a metafile and a media stream (media segment) such as a video, an audio, or the like, transmitted via the RF transmission path or communication network transmission path.

As described above, in addition to the video stream, the MP4 includes a predetermined number of audio tracks (audio streams) including a plurality of groups of encoded data that compose 3D audio transmission data. Then, in the MPD file, attribute information that indicates each attribute of the plurality of groups of encoded data included in the 3D audio transmission data is inserted and stream correspondence relation information that indicates which audio track (audio stream) the encoded data of the plurality of groups is included respectively.

The service receiver 200 selectively performs a decode process on the audio stream including encoded data of a group having an attribute compatible with a speaker configuration and user selection information on the basis of the attribute information and stream correspondence relation information and obtains an audio output of 3D audio.

[DASH/MP4 Generation Unit of Service Transmission System]

Figure 17:
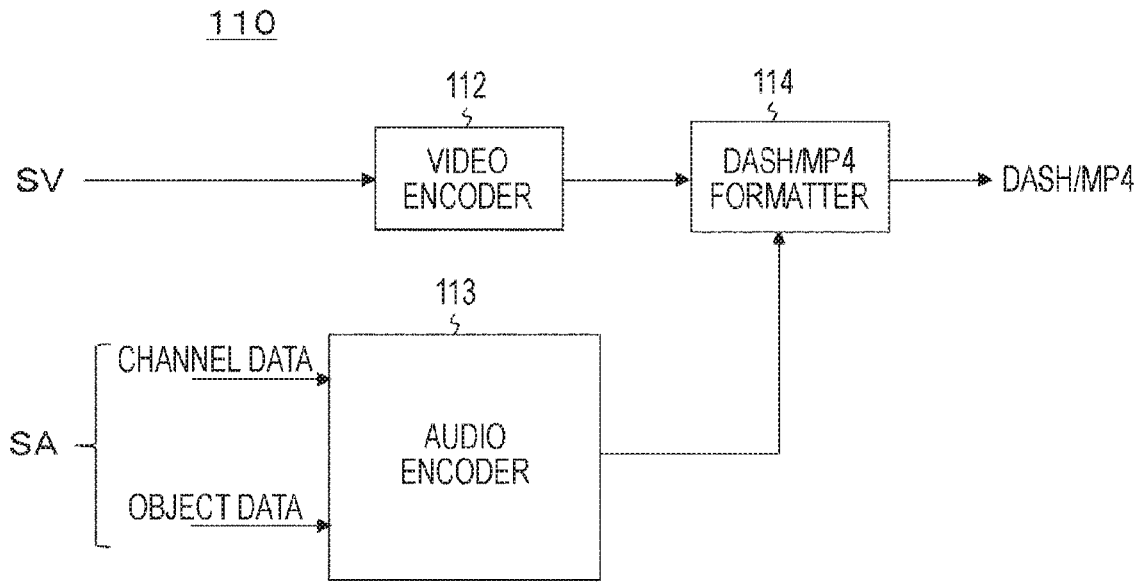
FIG. 17 is a block diagram illustrating an exemplary configuration of a DASH/MP4 generation unit included in a service transmission system.

FIG. 17 illustrates an exemplary configuration of a DASH/MP4 generation unit 110 included in the service transmission system 100. The DASH/MP4 generation unit 110 includes a control unit 111, a video encoder 112, an audio encoder 113, and a DASH/MP4 formatter 114.

The video encoder 112 inputs video data SV, performs encoding such as MPEG2, H.264/AVC, and H.265/HEVC on the video data SV, and generates a video stream (video elementary stream). The audio encoder 113 inputs, as audio data SA, object data of an immersive audio and a speech dialog together with channel data.

The audio encoder 113 performs encoding of MPEGH on the audio data SA and obtains 3D audio transmission data. As illustrated in FIG. 5, the 3D audio transmission data includes channel encoded data (CD), immersive audio object encoded data (IAO), and speech dialog object encoded data (SDO). The audio encoder 113 generates one or more audio streams (audio elementary streams) including encoded data of a plurality of groups, that is, four groups in this example (see FIGS. 6(a) and 6(b)).

The DASH/MP4 formatter 114 generates an MP4 including a media stream (media segment) of a video and an audio as the content on the basis of the video stream generated in the video encoder 112 and the predetermined number of audio streams generated in the audio encoder 113. Here, each stream of the video or audio is stored in the MP4 as separate tracks (tracks) respectively.

Further, the DASH/MP4 formatter 114 generates an MPD file by using content metadata, segment URL information, and the like. In the present embodiment, the DASH/MP4 formatter 114 inserts, in the MPD file, attribute information that indicates each attribute of the encoded data of the plurality of groups included in the 3D audio transmission data and also inserts stream correspondence relation information that indicates which audio track (audio stream) the encoded data of the plurality of groups is included respectively (see FIGS. 11 and 12).

An operation of the DASH/MP4 generation unit 110 illustrated in FIG. 17 will be briefly explained. The video data SV is supplied to the video encoder 112. The video encoder 112 performs encoding of H.264/AVC, H.265/HEVC, or the like on the video data SV and generates a video stream including encoded video data. The video stream is supplied to the DASH/MP4 formatter 114.

The audio data SA is supplied to the audio encoder 113. The audio data SA includes channel data and object data of an immersive audio and a speech dialog. The audio encoder 113 performs encoding of MPEGH on the audio data SA and obtains 3D audio transmission data.

The 3D audio transmission data includes immersive audio object encoded data (IAO) and speech dialog object encoded data (SDO) in addition to the channel encoded data (CD) (see FIG. 5). Then, the audio encoder 113 generates one or more audio streams including four groups of encoded data (see FIGS. 6(a) and 6(b)). The audio stream is supplied to the DASH/MP4 formatter 114.

The DASH/MP4 formatter 114 generates an MP4 including media stream (media segment) of a video, an audio or the like of the content on the basis of the video stream generated in the video encoder 112 and the predetermined number of audio streams generated in the audio encoder 113. Here, each stream of the video and audio is stored in the MP4 as separated tracks (track) respectively.

Further, the DASH/MP4 formatter 114 generates an MPD file by using content metadata, segment URL information, or the like. In the MPD file, attribute information that indicates each attribute of the encoded data of the plurality of groups included in the 3D audio transmission data is inserted and stream correspondence relation information that indicates which audio track (audio stream) the encoded data of the plurality of groups is included respectively is also inserted.

[Exemplary Configuration of Service Receiver]

Figure 18:
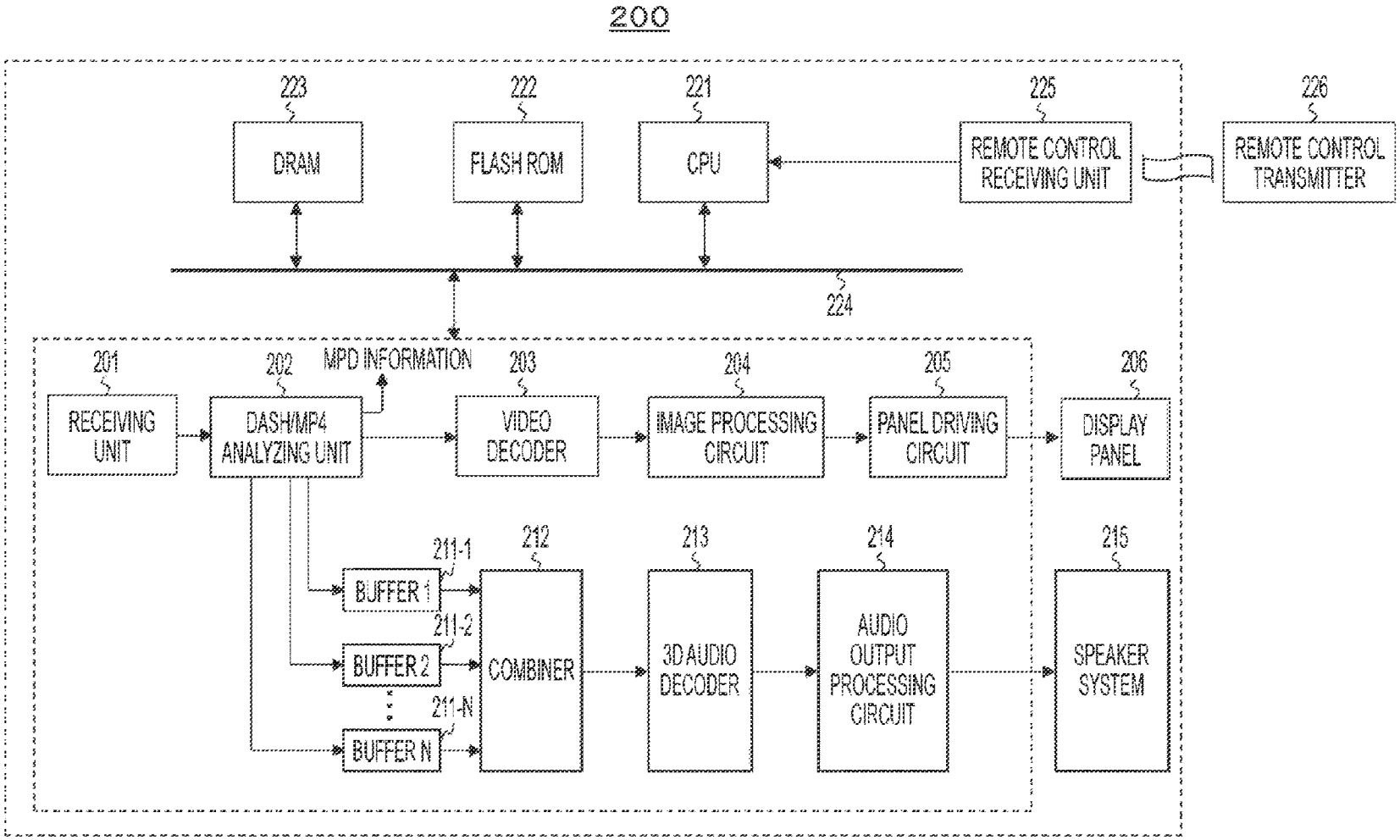
FIG. 18 is a block diagram illustrating an exemplary configuration of a service receiver.

FIG. 18 illustrates an exemplary configuration of the service receiver 200. The service receiver 200 includes a receiving unit 201, a DASH/MP4 analyzing unit 202, a video decoder 203, an image processing circuit 204, a panel driving circuit 205, and a display panel 206. Further, the service receiver 200 includes container buffers 211-1 to 211-N, a combiner 212, a 3D audio decoder 213, an audio output processing circuit 214, and a speaker system 215. Further, the service receiver 200 includes a CPU 221, a flash ROM 222, a DRAM 223, an internal bus 224, a remote control receiving unit 225, and a remote control transmitter 226.

The CPU 221 controls an operation of each unit in the service receiver 200. The flash ROM 222 stores control software and saves data. The DRAM 223 composes a work area of the CPU 221. The CPU 221 activates software by developing software or data read from the flash ROM 222 in the DRAM 223 and controls each unit in the service receiver 200.

The remote control receiving unit 225 receives a remote control signal (remote control code) transmitted from the remote control transmitter 226 and supplies the signal to the CPU 221. The CPU 221 controls each unit in the service receiver 200 on the basis of the remote control code. The CPU 221, flash ROM 222, and DRAM 223 are connected to the internal bus 224.

The receiving unit 201 receives a DASH/MP4, which is an MPD file as metafile, and an MP4 including a media stream (media segment) such as a video and an audio, transmitted from the service transmission system 100 via the RF transmission path or communication network transmission path.

In addition to a video stream, the MP4 includes a predetermined number of audio tracks (audio streams) including a plurality of groups of encoded data composing the 3D audio transmission data. Further, in the MPD file, attribute information that indicates each attribute of the encoded data of the plurality of groups included in the 3D audio transmission data is inserted and stream correspondence relation information that indicates which audio track (audio stream) the encoded data of the plurality of groups is included respectively is also inserted.

The DASH/MP4 analyzing unit 202 analyzes the MPD file and MP4 received by the receiving unit 201. The DASH/MP4 analyzing unit 202 extracts a video stream from the MP4 and transmits the video stream to the video decoder 203. The video decoder 203 performs a decoding process on the video stream and obtains uncompressed video data.

The image processing circuit 204 performs a scaling process and an image quality adjusting process on the video data obtained by the video decoder 203 and obtains video data for displaying. The panel driving circuit 205 drives the display panel 206 on the basis of the video data to be displayed, which is obtained by the image processing circuit 204. The display panel 206 is configured with, for example, a liquid crystal display (LCD), an organic electroluminescence display (organic EL display), or the like.

Further, the DASH/MP4 analyzing unit 202 extracts MPD information included in the MPD file and transmits the MPD information to the CPU 221. The CPU 221 controls an obtaining process of a stream of a video or an audio on the basis of the MPD information. Further, the DASH/MP4 analyzing unit 202 extracts metadata such as header information of each track, meta description of the content substance, time information, for example, from the MP4 and transmits the metadata to the CPU 221.

The CPU 21 recognizes an audio track (audio stream) including encoded data of a group having an attribute compatible with a speaker configuration and viewer (user) selection information, on the basis of the attribute information indicating an attribute of encoded data of each group and the stream correspondence relation information indicating in which audio track (audio stream) each group is included in the MPD file.

Further, under the control by the CPU 221, the DASH/MP4 analyzing unit 202 refers to the level ID (level ID), the track ID (track ID) in other words, and selectively extracts one or more audio streams including encoded data of a group having an attribute compatible with the speaker configuration and viewer (user) selection information among the predetermined number of audio streams included in the MP4.

The container buffers 211-1 to 211-N import each audio stream extracted by the DASH/MP4 analyzing unit 202 respectively. Here, N of the number of container buffers 211-1 to 211-N is a necessary and sufficient number and, in an actual operation, the number is equivalent to the number of audio streams extracted in the DASH/MP4 analyzing unit 202.

The combiner 212 reads audio stream of each audio frame from the container buffers, among the container buffers 211-1 to 211-N, in which each audio stream extracted by the DASH/MP4 analyzing unit 202 is imported, and supplies, to the 3D audio decoder 213, encoded data of a group having an attribute compatible with the speaker configuration and viewer (user) selection information.

The 3D audio decoder 213 performs a decode process on the encoded data supplied from the combiner 212 and obtains audio data to drive each speaker of the speaker system 215. Here, there may be three cases of the encoded data on which the decode process is performed, which are a case that only channel encoded data is included, a case that only object encoded data is included, and a case that both of channel encoded data and object encoded data are included.

When decoding the channel encoded data, the 3D audio decoder 213 obtains audio data to drive each speaker by performing downmixing and upmixing for the speaker configuration of the speaker system 215. Further, when decoding the object encoded data, the 3D audio decoder 213 calculates speaker rendering (a mixing rate for each speaker) on the basis of object information (metadata) and mixes the audio data of the object to the audio data to drive each speaker according to the calculation result.

The audio output processing circuit 214 performs a necessary process such as D/A conversion, amplification, or the like on the audio data to drive each speaker, which is obtained from the 3D audio decoder 213, and supplies the data to the speaker system 215. The speaker system. 215 includes multiple speakers such as multiple channels, for example, 2 channel, 5.1 channel, 7.1 channel, 22.2 channel, or the like.

An operation of the service receiver 200 illustrated in FIG. 18 will be explained. In the receiving unit 201, a DASH/MP4, which is an MPD file as a metafile, and an MP4 including a media stream (media segment) such as a video and an audio are received from the service transmission system 100 via the RF transmission path or communication network transmission path. The MPD file and MP4 received in this manner are supplied to the DASH/MP4 analyzing unit 202.

In the DASH/MP4 analyzing unit 202, the MPD file and MP4 received in the receiving unit 201 are analyzed. Then, in the DASH/MP4 analyzing unit 202, a video stream is extracted from the MP4 and transmitted to the video decoder 203. In the video decoder 203, a decoding process is performed on the video stream and uncompressed video data is obtained. The video data is supplied to the image processing circuit 204.

In the image processing circuit 204, a scaling process, an image quality adjusting process, or the like are performed on the video data obtained in the video decoder 203 and video data to be displayed is obtained. The video data to be displayed is supplied to the panel driving circuit 205. In the panel driving circuit 205, the display panel 206 is driven on the basis of the video data to be displayed. With this configuration, on the display panel 206, an image corresponding to the video data to be displayed is displayed.

Further, in the DASH/MP4 analyzing unit 202, MPD information included in the MPD file is extracted and transmitted to the CPU 221. Further, in the DASH/MP4 analyzing unit 202, metadata, for example, header information of each track, a meta description of a content substance, time information or the like are extracted from the MP4 and transmitted to the CPU 221. In the CPU 221, an audio track (audio stream) in which encoded data of a group having attribute compatible with the speaker configuration and viewer (user) selection information is recognized on the basis of the attribute information, stream correspondence relation information, or the like included in the MPD file.

Further, under the control by the CPU 221, in the DASH/MP4 analyzing unit 202, one or more audio streams including the encoded data of the group having the attribute compatible with the speaker configuration and viewer (user) selection information is selectively extracted from the predetermined number of audio streams included in the MP4 by referring to the track ID (track ID).

The audio stream extracted in the DASH/MP4 analyzing unit 202 is imported to a corresponding container buffer among the container buffers 211-1 to 211-N. In the combiner 212, audio stream is read from each audio frame from each container buffer in which the audio stream is imported and supplied to the 3D audio decoder 213 as encoded data of the group having the attribute compatible with the speaker configuration and viewer selection information. In the 3D audio decoder 213, a decode process is performed on the encoded data supplied from the combiner 212 and audio data for driving each speaker of the speaker system 215 is obtained.

Here, when the channel encoded data is decoded, processes of downmixing and upmixing for the speaker configuration of the speaker system 215 are performed and audio data for driving each speaker is obtained. Further, when the object encoded data is decoded, speaker rendering (a mixing rate for each speaker) is calculated on the basis of the object information (metadata), and audio data of the object is mixed to the audio data for driving each speaker according to the calculation result.

The audio data for driving each speaker, which is obtained in the 3D audio decoder 213, is supplied to the audio output processing circuit 214. In the audio output processing circuit 214, necessary processes such as D/A conversion, amplification, or the like are performed on the audio data for driving each speaker. Then, the processed audio data is supplied to the speaker system 215. With this configuration, a sound output corresponding to a display image of the display panel 206 is obtained from the speaker system 215.

Figure 19:
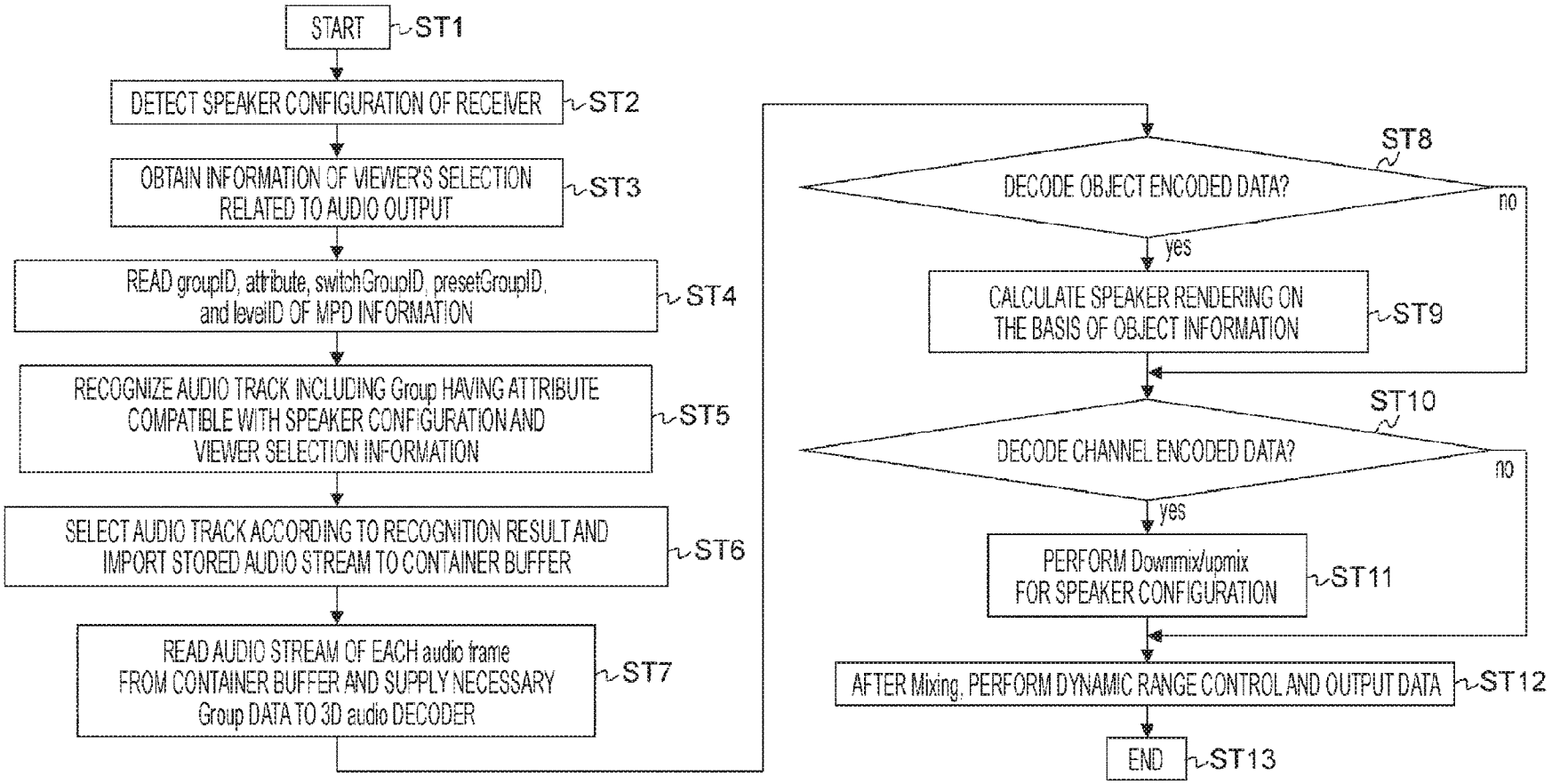
FIG. 19 is a flowchart illustrating an example of an audio decoding control process by a CPU in the service receiver.

FIG. 19 illustrates an example of an audio decoding control process by the CPU 221 in the service receiver 200 illustrated in FIG. 18. In step ST1, the CPU 221 starts the process. Then, in step ST2, the CPU 221 detects a speaker configuration of the receiver, that is the speaker configuration of the speaker system 215. Next, in step ST3, the CPU 221 acquires selection information related to an audio output from the viewer (user).

Next, in step ST4, the CPU 221 reads information related to each audio stream of the MPD information, which are "groupID," "attribute," "switchGroupID," "presetGroupID," and "levelID." Then, in step ST5, the CPU 221 recognizes a track ID (track ID) of an audio track to which an encoded data group having an attribute compatible with the speaker configuration and viewer selection information belongs.

Next, in step ST6, the CPU 221 selects each audio track on the basis of the recognition result and imports the stored audio stream to the container buffer. Then, in step ST7, the CPU 221 reads the audio stream for each audio frame from the container buffer and supplies encoded data of a necessary group to the 3D audi decoder 213.

Next, in step ST8, the CPU 221 determines whether or not to decode the object encoded data. When the object encoded data is decoded, the CPU 221 calculates speaker rendering (a mixing rate for each speaker) by using azimuth (orientation information) and elevation (elevation angle information) on the basis of the object information (metadata) in step ST9. After that, the CPU 221 proceeds to a process in step ST10. Here, in step ST8, when the object encoded data is not decoded, the CPU 221 immediately proceeds to a process in step ST10.

In step ST10, the CPU 221 determines whether or not to decode the channel encoded data. When the channel encoded data is decoded, the CPU 221 performs processes of downmixing and upmixing for the speaker configuration of the speaker system 215 and obtains audio data for driving each speaker in step ST11. After that, the CPU 221 proceeds to a process in step ST12. Here, when the object encoded data is not decoded in step ST10, the CPU 221 immediately proceeds to a process in step ST12.

In step ST12, when decoding the object encoded data, the CPU 221 mixes the audio data of the object to the audio data for driving each speaker according to the calculation result in step ST9 and performs a dynamic range control after that. Then, the CPU 21 ends the process in step ST13. Here, when the object encoded data is not decoded, the CPU 221 skips the process in step ST12.

As described above, in the transceiving system 10 illustrated in FIG. 3, the service transmission system 100 inserts, to the MPD file, attribute information that indicates each attribute of the encoded data of the plurality of groups included in a predetermined number of audio streams. Thus, the receiving side can easily recognize each attribute of encoded data of the plurality of groups before decoding the encoded data so that encoded data of the necessary group can be selectively decoded and used and this can reduce the process load.

Further, in the transceiving system 10 illustrated in FIG. 3, the service transmission system 100 inserts, to the MPD file, stream correspondence relation information that indicates which audio track (audio stream) the encoded data of the plurality of groups are included respectively. Thus, the receiving side can easily recognize the audio track (audio stream) in which the encoded data of the necessary group is included and the process load can be reduced.

2. Modified Examples

Here, in the above embodiments, the service receiver 200 is configured to selectively extract the audio stream in which the encoded data of the group having an attribute compatible with the speaker configuration and viewer selection information from the plurality of audio streams transmitted from the service transmission system 100 and obtain audio data for driving a predetermined number of speakers by performing a decode process.

Here, as a service receiver, it may be considered to selectively extract one or more audio streams including encoded data of a group having an attribute compatible with the speaker configuration and viewer selection information from a plurality of audio streams transmitted from the service transmission system 100, reconfigure an audio stream having the encoded data of the group having the attribute compatible with the speaker configuration and viewer selection information, and distribute the reconfigured audio stream to a device (including a DLNA device) which is connected to an internal network.

Figure 20:
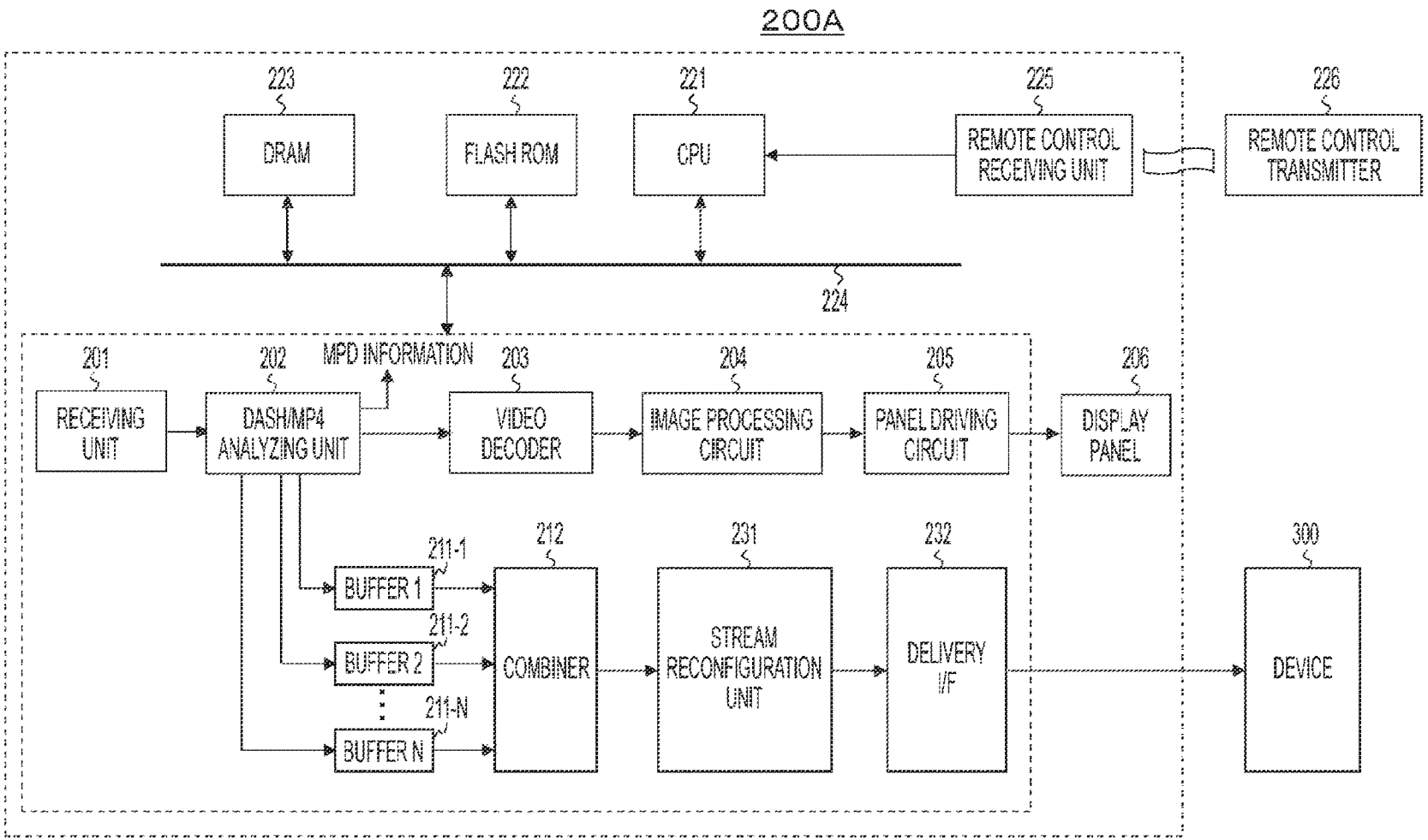
FIG. 20 is a block diagram illustrating another exemplary configuration of the service receiver.

FIG. 20 illustrates an exemplary configuration of a service receiver 200A that distributes the reconfigured audio stream to the device connected to the internal network as described above. In FIG. 20, the same reference numerals are applied to the parts corresponding to those in FIG. 18 and the detailed explanation thereof will be omitted according to need.

Under the control by the CPU 221, the DASH/MP4 analyzing unit 202 refers to a level ID (level ID), that is, a track ID (track ID), and selectively extracts one or more audio streams including the encoded data of the group having the attribute compatible with the speaker configuration and viewer (user) selection information from a predetermined number of audio streams included in the MP4.

The audio stream extracted in the DASH/MP4 analyzing unit 202 is imported to a corresponding container buffer among the container buffers 211-1 to 211-N. In the combiner 212, an audio stream for each audio frame is read from each container buffer, in which the audio stream is imported, and supplied to a stream reconfiguration unit 231.

In the stream reconfiguration unit 231, the encoded data of the predetermined group having the attribute compatible with the speaker configuration and viewer selection information is selectively acquired and the audio stream having the encoded data of the predetermined group is reconfigured. The reconfigured audio stream is supplied to a delivery interface 232. Then, the reconfigured audio stream is delivered (transmitted) to a device 300 connected to the internal network from the delivery interface 232.

The internal network connection includes Ethernet connection and wireless connection such as "WiFi" and "Bluetooth." Here, "WiFi" and "Bluetooth" are registered trademarks.

Further, the device 300 includes a surround sound speaker, a second display, an audio output device attached to a network terminal. The device 300 that receives the delivery of the reconfigured audio stream performs a decode process similarly to the 3D audio decoder 213 in the service receiver 200 of FIG. 18 and obtains audio data for driving a predetermined number of speakers.

Further, a service receiver may have a configuration that transmits the above described reconfigured audio stream to a device connected by a digital interface such as "high-definition multimedia interface (HDMI)," "mobile high definition link (MHL)," "DisplayPort" and the like. Here, "HDMI" and "MHL" are registered trademarks.

Further, the above described embodiment describes an example that a field of "attribute" is provided and attribute information of encoded data of each group is transmitted (see FIGS. 11 to 13). However, the present technology includes a method that a particular meaning to a value itself of a group ID (GroupID) is defined between transmitters and receivers so that a type (attribute) of encoded data can be recognized by recognizing a particular group ID. In this case, the group ID serves as attribute information of encoded data of the group in addition to serving as an identifier of the group and the field of "attribute" is not needed.

Further, the above described embodiments describe an example that channel encoded data and object encoded data are included in encoded data of a plurality of groups (see FIG. 5). However, the present technology may be applied, in a similar manner, to a case that encoded data of a plurality of groups includes only channel encoded data or only object encoded data.

Here, the present technology may have the following configurations.

(1) A transmission device including:

a transmitting unit configured to transmit a metafile having meta information used to acquire, in a reception device, a predetermined number of audio streams including a plurality of groups of encoded data; and an information inserting unit configured to insert, to the metafile, attribute information indicating each attribute of the encoded data of the plurality of groups.

(2) The transmission device according to (1), wherein the information inserting unit further inserts, to the metafile, stream correspondence relation information indicating in which audio stream the encoded data of the plurality of groups is included respectively.

(3) The transmission device according to (2), wherein the stream correspondence relation information is information indicating a correspondence relation between group identifiers that respectively identify each piece of the encoded data of the plurality of groups and identifiers that respectively identify each of the predetermined number of audio streams.

(4) The transmission device according to any of (1) to (3), wherein the metafile is an MPD file.

(5) The transmission device according to (4), wherein the information inserting unit inserts the attribute information to the metafile by using "Supplementary Descriptor."

(6) The transmission device according to any of (1) to (5), wherein the transmitting unit transmits the metafile via an RF transmission path or a communication network transmission path.

(7) The transmission device according to any of (1) to (6), wherein the transmitting unit further transmits a container in a predetermined format having the predetermined number of audio streams including the encoded data of the plurality of groups.

(8) The transmission device according to (7), wherein the container is an MP4.

(9) The transmission device according to any of (1) to (8), wherein the encoded data of the plurality of groups includes one of or both of channel encoded data and object encoded data.

(10) A transmission method including:

a transmission step of transmitting, by a transmitting unit, a metafile having meta information used to acquire, in a reception device, a predetermined number of audio streams including a plurality of groups of encoded data; and an information insertion step of inserting, to the metafile, attribute information indicating each attribute of the encoded data of the plurality of groups.

(11) A reception device including:

a receiving unit configured to receive a metafile having meta information used to acquire, in the reception device, a predetermined number of audio streams including a plurality of groups of encoded data, the metafile including inserted attribute information that indicates each attribute of the encoded data of the plurality of groups; and a processing unit configured to process the predetermined number of audio streams on the basis of the attribute information.

(12) The reception device according to (11), wherein to the metafile, stream correspondence relation information indicating in which audio stream the encoded data of the plurality of groups is included respectively is further inserted, and the processing unit processes the predetermined number of audio streams on the basis of the stream correspondence relation information as well as the attribute information.

(13) The reception device according to (12), wherein the processing unit selectively performs a decode process on an audio stream including encoded data of a group having an attribute compatible with a speaker configuration and user selection information, on the basis of the attribute information and the stream correspondence relation information.

(14) The reception device according to any of (11) to (13), wherein the encoded data of the plurality of groups includes one of or both of channel encoded data and object encoded data.

(15) A reception method including:

a receiving step of receiving, by a receiving unit, a metafile having meta information used to acquire, in a reception device, a predetermined number of audio streams including a plurality of groups of encoded data, the metafile including inserted attribute information indicating each attribute of the encoded data of the plurality of groups; and a processing step of processing the predetermined number of audio streams on the basis of the attribute information.

(16) A reception device including:

a receiving unit configured to receive a metafile having meta information used to acquire, in the reception device, a predetermined number of audio streams including a plurality of groups of encoded data, the metafile including inserted attribute information indicating each attribute of the encoded data of the plurality of groups;

a processing unit configured to selectively acquire encoded data of a predetermined group from the predetermined number of audio streams on the basis of the attribute information, and reconfigure an audio stream including the encoded data of the predetermined group; and a stream transmitting unit configured to transmit the reconfigured audio stream to an external device.

(17) The reception device according to (16), wherein to the metafile, stream correspondence relation information indicating in which audio stream the encoded data of the plurality of groups is included respectively is further inserted, and the processing unit selectively acquires the encoded data of the predetermined group from the predetermined number of audio streams on the basis of the stream correspondence relation information as well as the attribute information.

(18) A reception method including:

a receiving step of receiving, by a receiving unit, a metafile having meta information used to acquire, in a reception device, a predetermined number of audio streams including a plurality of groups of encoded data, the metafile including inserted attribute information indicating each attribute of the encoded data of the plurality of groups;

a processing step of selectively acquiring encoded data of a predetermined group from the predetermined number of audio streams on the basis of the attribute information and reconfiguring an audio stream including the encoded data of the predetermined group; and a stream transmission step of transmitting the reconfigured audio stream to an external device.

Major characteristics of the present technology can reduce the process load in the reception side by inserting, to an MPD file, attribute information that indicates respective attributes of encoded data of a plurality of groups included in a predetermined number of audio streams and stream correspondence relation information that indicates which audio track (audio stream) the encoded data of the plurality of groups is included respectively (see FIGS. 11, 12, and 17).

REFERENCE SIGNS LIST

10 Transceiving system
30A, 30B MPEG-DASH-based stream delivery system
31 DASH stream file server
32 DASH MPD server
33, 33-1 to 33-N) Service receiver
34 CDN
35, 35-1 to 35-M) Service receiver
36 Broadcast transmission system
100 Service transmission system
110 DASH/MP4 generation unit
112 Video encoder
113 Audio encoder
114 DASH/MP4 formatter
200 Service receiver
201 Receiving unit
202 DASH/MP4 analyzing unit
203 Video decoder
204 Image processing circuit

205 Panel driving circuit
206 Display panel
211-1 to 211-N Container buffer
212 Combiner
213 3D audio decoder
214 Audio output processing circuit
215 Speaker system
221 CPU
222 Flash ROM
223 DRAM
224 Internal bus
225 Remote control receiving unit
226 Remote control transmitter
231 Stream reconfiguration unit
232 Delivery interface
300 Device

The invention claimed is:

1. A transmission device comprising: processing circuitry configured to:

generate a metafile having meta information used to acquire, by a reception device, one or more groups of encoded data of a plurality of groups of encoded data carried by a predetermined number of audio streams from a source outside the reception device, each audio stream of the predetermined number of audio streams including a respective subset of the plurality of groups of encoded data;

insert, to the metafile for a particular group of encoded data of the plurality of groups of encoded data, attribute information indicating an attribute of the particular group of encoded data;

insert, to the metafile, preset identification information that includes a preset identifier in association with a particular group identifier, the preset identifier identifying a preset collection of groups of encoded data with which the particular group of encoded data is associated, and the particular group identifier identifying the particular group of encoded data; and insert, to the metafile, stream correspondence relation information indicating in which audio stream, of the audio streams, each group of the plurality of groups of encoded data are included; and transmission circuitry configured to transmit the metafile to the reception device.

2. The transmission device according to claim 1, wherein the stream correspondence relation information includes information indicating a correspondence relation between group identifiers that respectively identify each of the plurality of groups of encoded data and identifiers that respectively identify each of the predetermined number of audio streams.

3. The transmission device according to claim 1, wherein the metafile is a media presentation description (MPD) file.

4. The transmission device according to claim 3, wherein the processing circuitry is further configured to insert, to the metafile, the attribute information by using a supplementary descriptor.

5. The transmission device according to claim 1, wherein the transmission circuitry is configured to transmit the metafile via an RF transmission path or a communication network transmission path.

6. The transmission device according to claim 1, wherein the transmission circuitry is configured to transmit a container in a predetermined format that carries the predetermined number of audio streams including the plurality of groups of encoded data.

7. The transmission device according to claim 6, wherein the container is an MP4 container.

8. The transmission device according to claim 1, wherein the plurality of groups of encoded data includes one of or both of channel encoded data and object encoded data.

9. A transmission method comprising:

generating, by processing circuitry of a transmission device, a metafile having meta information used to acquire, by a reception device, one or more groups of encoded data of a plurality of groups of encoded data carried by a predetermined number of audio streams from a source outside the reception device, each audio stream of the predetermined number of audio streams including a respective subset of the plurality of groups of encoded data;

inserting, by the processing circuitry of the transmission device to the metafile for a particular group of encoded data of the plurality of groups of encoded data, attribute information indicating an attribute of the particular group of encoded data;

inserting, by the processing circuitry of the transmission device to the metafile, preset identification information that includes a preset identifier in association with a particular group identifier, the preset identifier identifying a preset collection of groups of encoded data with which the particular group of encoded data is associated, and the particular group identifier identifying the particular group of encoded data;

inserting, to the metafile, stream correspondence relation information indicating in which audio stream, of the audio streams, each group of the plurality of groups of encoded data are included; and transmitting, by transmission circuitry of the transmission device, the metafile to the reception device.

10. A reception device comprising:

reception circuitry configured to receive a metafile having meta information used to acquire one or more groups of encoded data of a plurality of groups of encoded data carried by a predetermined number of audio streams from a source outside the reception device, each audio stream of the predetermined number of audio streams including a respective subset of the plurality of groups of encoded data, the metafile including attribute information for a particular group of encoded data of the plurality of groups of encoded data that indicates an attribute of the particular group of encoded data, the metafile including preset identification information that includes a preset identifier in association with a particular group identifier, the preset identifier identifying a preset collection of groups of encoded data with which the particular group of encoded data is associated, and the particular group identifier identifying the particular group of encoded data, and the metafile including stream correspondence relation information indicating in which audio stream, of the audio streams, each group of the plurality of groups of encoded data are included; and processing circuitry configured to control acquiring the one or more groups of encoded data on the basis of the attribute information, the preset identification information, or the stream correspondence relation information.

11. The reception device according to claim 10, wherein the processing circuitry is configured to selectively perform a decoding process on an audio stream including a group of encoded data having an attribute compatible with a speaker configuration and user selection information, on the basis of the attribute information and the stream correspondence relation information.

12. The reception device according to claim 10, wherein the plurality of groups of encoded data includes one of or both of channel encoded data and object encoded data.

13. A reception method comprising:

receiving, by reception circuitry of a reception device, a metafile having meta information used to acquire one or more groups of encoded data of a plurality of groups of encoded data carried by a predetermined number of audio streams from a source outside the reception device, each audio stream of the predetermined number of audio streams including a respective subset of the plurality of groups of encoded data, the metafile including attribute information for a particular group of encoded data of the plurality of groups of encoded data indicating an attribute of the particular group of encoded data, the metafile including preset identification information that includes a preset identifier in association with a particular group identifier, the preset identifier identifying a preset collection of groups of encoded data with which the particular group of encoded data is associated, and the particular group identifier identifying the particular group of encoded data, and the metafile including stream correspondence relation information indicating in which audio stream, of the audio streams, each group of the plurality of groups of encoded data are included; and controlling, by processing circuitry of the reception device, acquiring the one or more groups of encoded data on the basis of the attribute information, the preset identification information, or the stream correspondence relation information.

14. A reception device comprising:

reception circuitry configured to receive a metafile having meta information used to acquire one or more groups of encoded data of a plurality of groups of encoded data carried by a predetermined number of audio streams from a source outside the reception device, each audio stream of the predetermined number of audio streams including a respective subset of the plurality of groups of encoded data, the metafile including attribute information for a particular group of encoded data of the plurality of groups of encoded data indicating an attribute of the particular group of encoded data, the metafile including preset identification information that includes a preset identifier in association with a particular group identifier, the preset identifier identifying a preset collection of groups of encoded data with which the particular group of encoded data is associated, and the particular group identifier identifying the particular group of encoded data, and the metafile including stream correspondence relation information indicating in which audio stream, of the audio streams, each group of the plurality of groups of encoded data are included;

processing circuitry configured to selectively acquire the one or more groups of encoded data on the basis of the attribute information, the preset identification information, or the stream correspondence relation information, and reconfigure an audio stream including the one or more groups of encoded data; and transmission circuitry configured to transmit the reconfigured audio stream to an external device.

15. A reception method comprising:

receiving, by reception circuitry of a reception device, a metafile having meta information used to acquire one or more groups of encoded data of a plurality of groups of encoded data carried by a predetermined number of audio streams from a source outside the reception device, each audio stream of the predetermined number of audio streams including a respective subset of the plurality of groups of encoded data, the metafile including attribute information for a particular group of encoded data of the plurality of groups of encoded data indicating an attribute of the particular group of encoded data, the metafile including preset identification information that includes a preset identifier in association with a particular group identifier, the preset identifier identifying a preset collection of groups of encoded data with which the particular group of encoded data is associated, and the particular group identifier identifying the particular group of encoded data, and the metafile including stream correspondence relation information indicating in which audio stream, of the audio streams, each group of the plurality of groups of encoded data are included;

selectively acquiring, by processing circuitry of the reception device, the one or more groups of encoded data on the basis of the attribute information, the preset identification information, or the stream correspondence relation information;

reconfiguring, by the processing circuitry of the reception device, an audio stream including the one or more groups of encoded data; and transmitting, by transmission circuitry of the reception device, the reconfigured audio stream to an external device.

*16. A reception device comprising:*

*a receiving unit configured to receive a metafile having meta information used to acquire, from communication network or broadcast, a predetermined number of audio streams including a plurality of groups of encoded data,*

*the metafile including attribute information that indicates each attribute of the encoded data of the plurality of groups,*

*the metafile including preset identification information that includes a preset identifier in association with a particular group identifier, the preset identifier identifying a preset collection of groups of encoded data with which a group of encoded data is associated, and the group identifier identifying the particular group of encoded data, and*

*the metafile including stream correspondence relation information indicating in which audio stream, of the audio streams, each group of the plurality of groups of encoded data are included; and*

*a processing unit configured to:*

*selectively acquire at least one group of encoded data on the basis of the attribute information, preset identification information, or stream correspondence relation information,*

*acquire selection information from user, and*

*decode encoded data of a group having an attribute compatible with speaker configuration of speaker system and the selection information on the basis of the attribute information.*

*17. The reception device according to claim 16, wherein the encoded data of the plurality of groups includes one of or both of channel encoded data and object encoded data, and*

*the processing unit further configured to obtain one of or both of channel data and object data.*

*18. The reception device according to claim 17, wherein the processing unit further configured to perform downmixing or upmixing on the channel data for the speaker configuration of speaker system.*

*19. The reception device according to claim 17, wherein the processing unit further configured to mix one or both of the object data and the channel data.*

*20. The reception device according to claim 18, wherein the processing unit is further configured to mix the object data and the channel data.*

*21. The reception device according to claim 16, wherein the processing unit is further configured to perform dynamic range control.*

*22. The reception device according to claim 17, wherein the processing unit is further configured to perform dynamic range control.*

*23. The reception device according to claim 18, wherein the processing unit is further configured to perform dynamic range control.*

*24. The reception device according to claim 19, wherein the processing unit is further configured to perform dynamic range control.*

* * * * *